US007346260B2

(12) United States Patent
Arakida et al.

(10) Patent No.: US 7,346,260 B2
(45) Date of Patent: Mar. 18, 2008

(54) OPTICAL WAVEGUIDE AND OPTICAL INFORMATION PROCESSING DEVICE

(75) Inventors: Takahiro Arakida, Kanagawa (JP); Hidehiko Nakata, Kanagawa (JP); Kenji Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 332 days.

(21) Appl. No.: 10/934,060

(22) Filed: Sep. 3, 2004

(65) Prior Publication Data

US 2005/0053330 A1 Mar. 10, 2005

(30) Foreign Application Priority Data

Sep. 5, 2003 (JP) .......................... P2003-314162

(51) Int. Cl.
*G02B 6/10* (2006.01)
*G02B 6/26* (2006.01)
*G02B 6/42* (2006.01)

(52) U.S. Cl. .......................... 385/146; 385/31; 385/46

(58) Field of Classification Search .................. 385/31, 385/46, 146

See application file for complete search history.

(56) References Cited

U.S. PATENT DOCUMENTS 4,089,583 A * 5/1978 Auracher et al. ............. 385/31
4,134,640 A * 1/1979 Auracher et al. ............. 385/31
4,164,364 A * 8/1979 Witte .......................... 385/31
5,463,705 A * 10/1995 Clauberg et al. ............. 385/14
5,467,104 A 11/1995 Furness et al.
5,949,931 A * 9/1999 Kitamura ..................... 385/28
6,157,760 A * 12/2000 Fujita et al. .................. 385/49
6,614,951 B2 * 9/2003 Lin ............................. 385/15
2002/0154879 A1 * 10/2002 Yasuda et al. ............. 385/132

FOREIGN PATENT DOCUMENTS

JP 05-173036 7/1993

* cited by examiner

*Primary Examiner*—Frank G. Font
*Assistant Examiner*—Erin D Chiem
(74) *Attorney, Agent, or Firm*—Robert J. Depke; Rockey, Depke & Lyons, LLC.

(57) ABSTRACT

A core layer has a light entrance region and a light exit region, said light entrance region having a width greater than said light exit region. The light entrance region has at least a side surface shaped as a reflecting surface. The light entrance region has an end having a parabolic shape. An LED is disposed in contact with a lower surface of the light entrance region. Signal light is introduced from the LED into the light entrance region with increased light entrance efficiency, and is highly efficiently reflected by the side surface of the light entrance region for higher light collecting efficiency.

4 Claims, 17 Drawing Sheets

F I G. 2 A
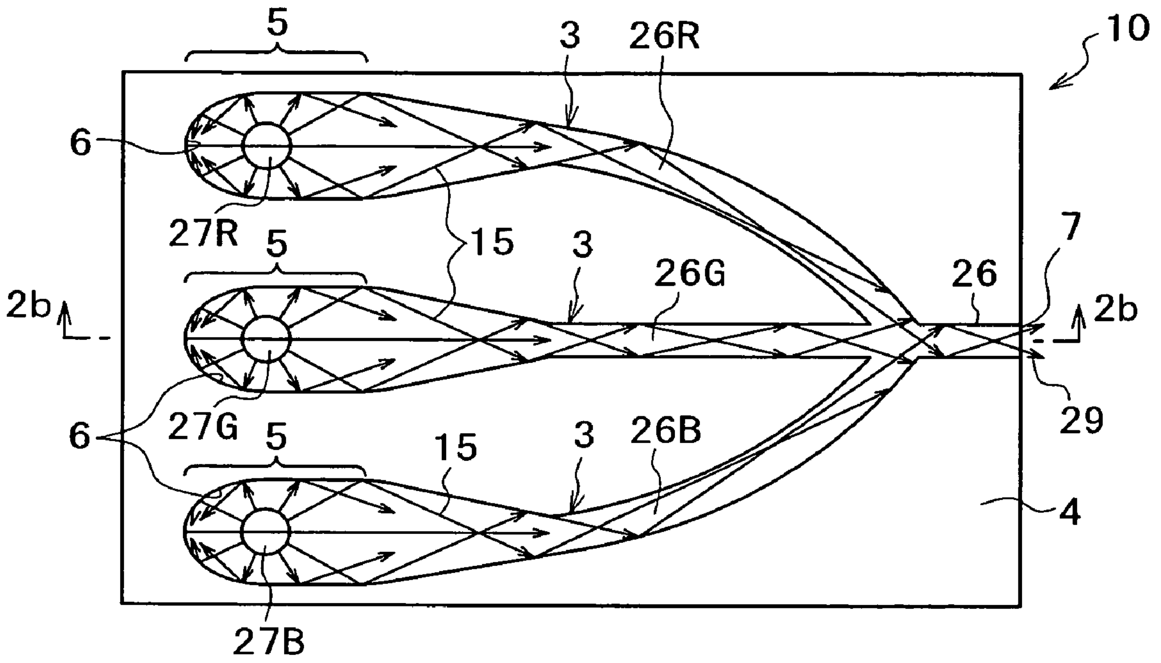
F I G. 2 B
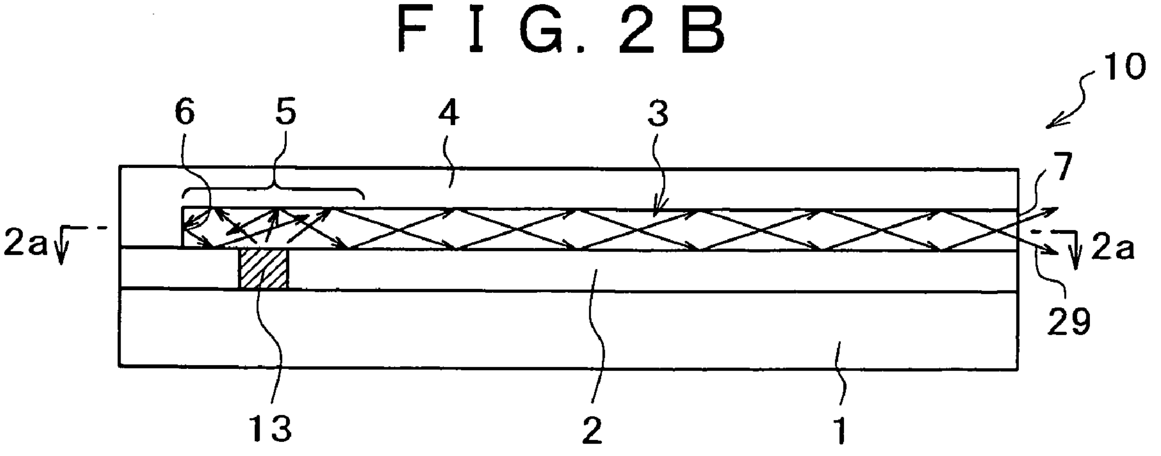

F I G. 4 A
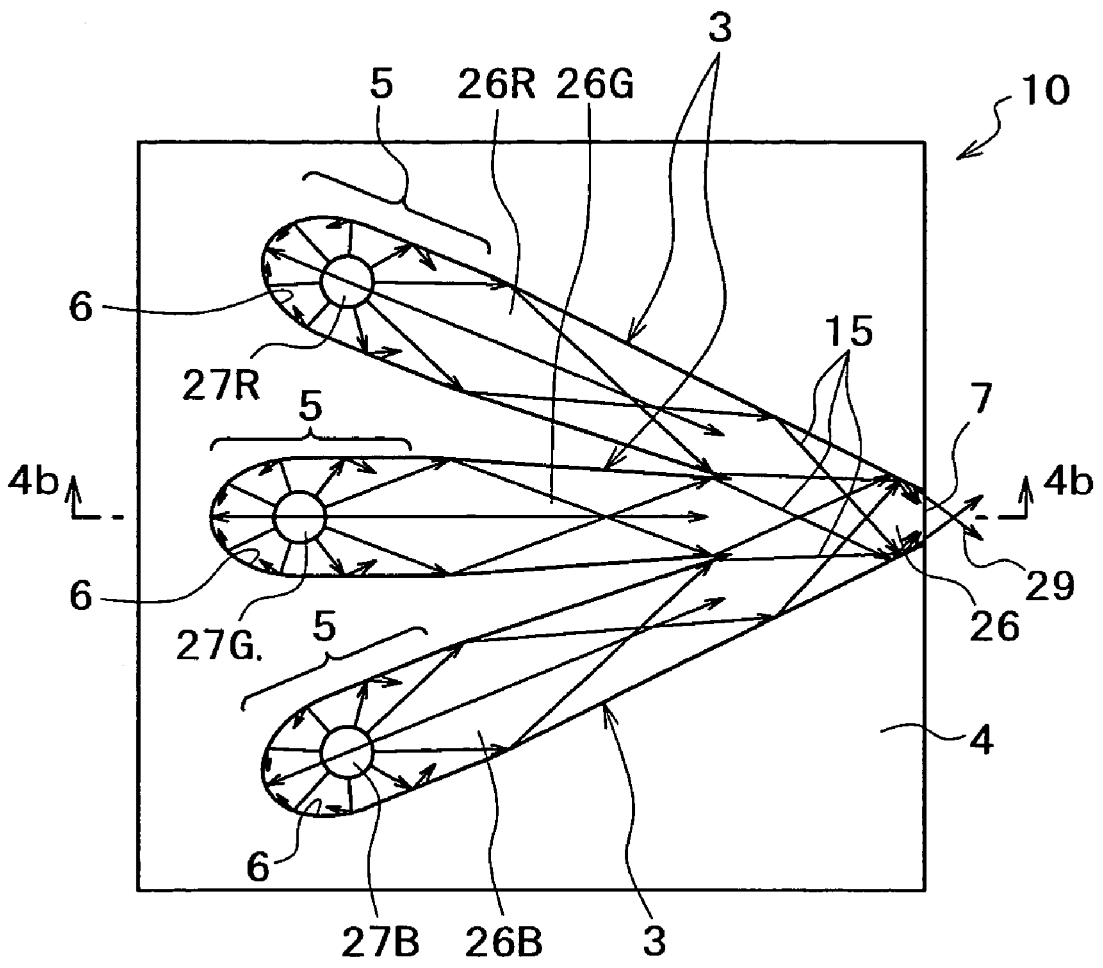
F I G. 4 B
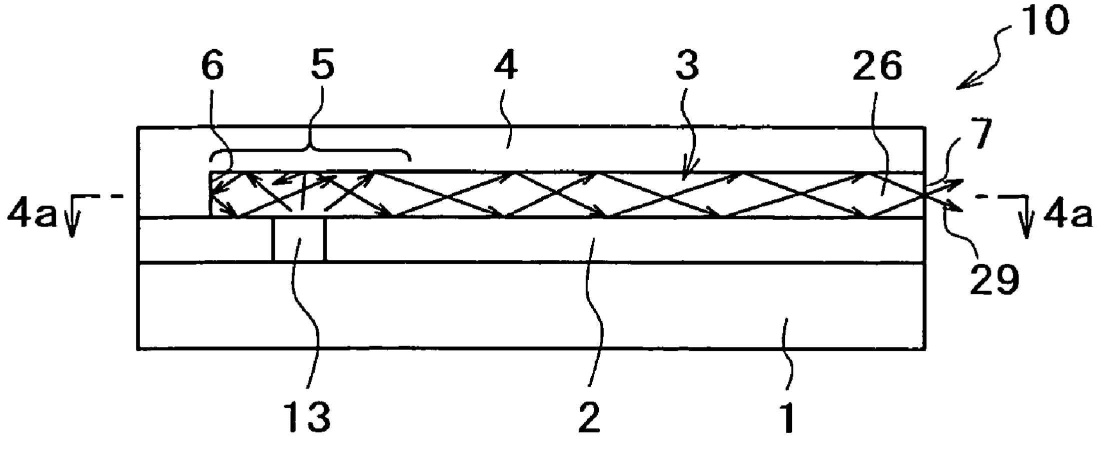

F I G. 7 A
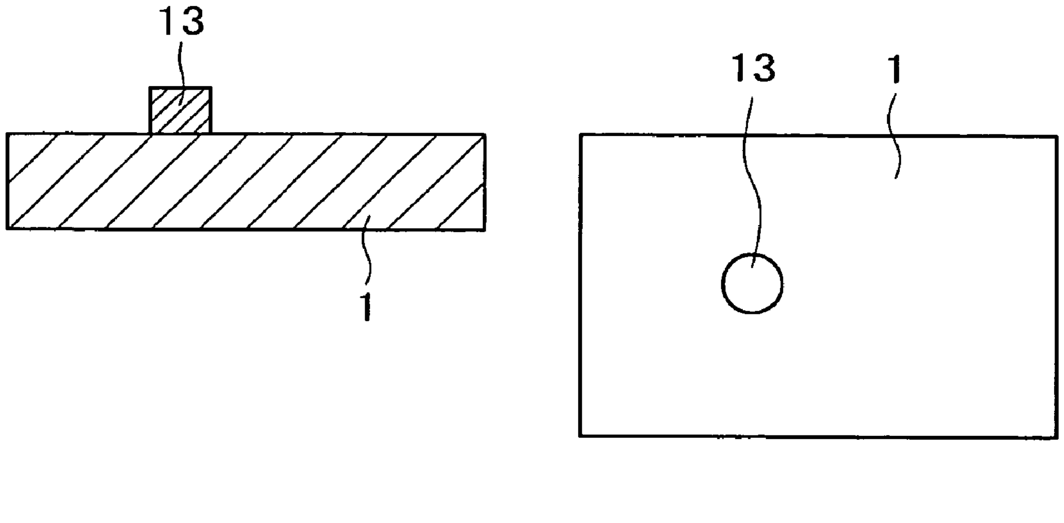
F I G. 7 B
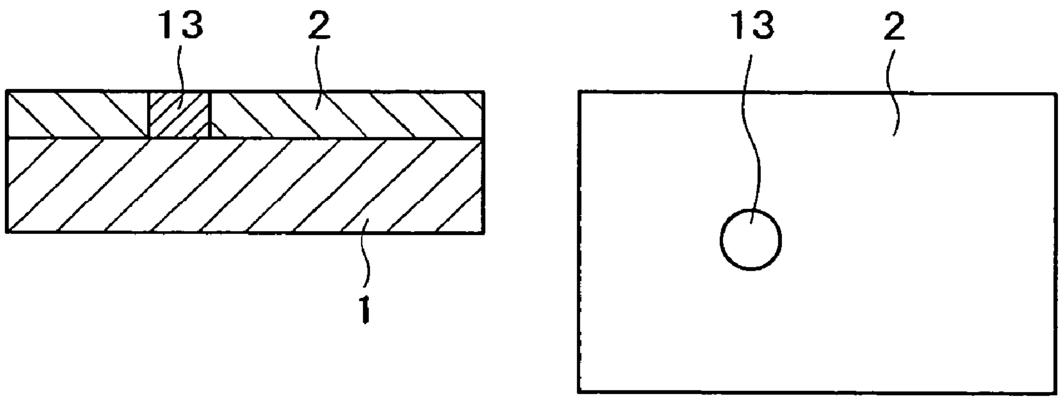
F I G. 7 C
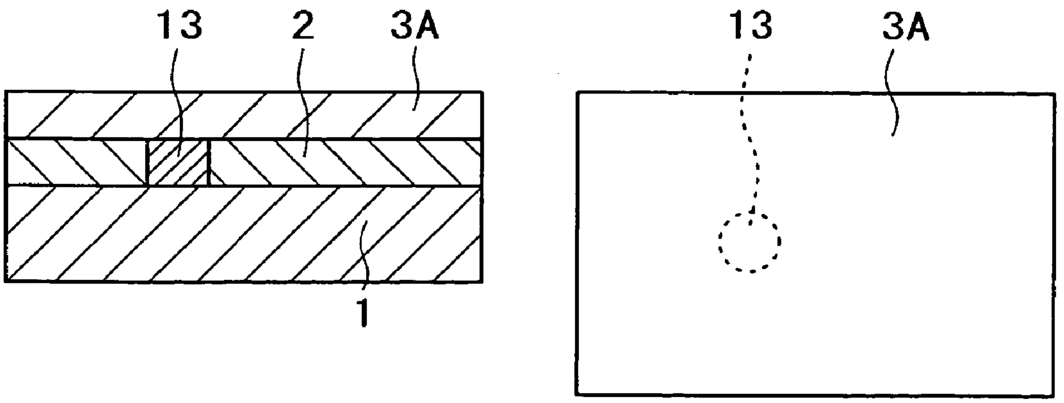

F I G. 2 1 A
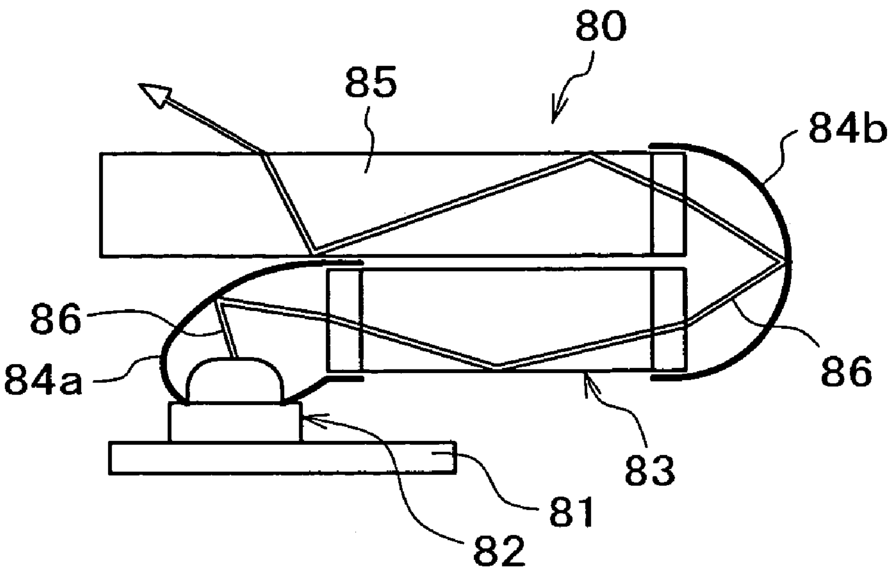
F I G. 2 1 B
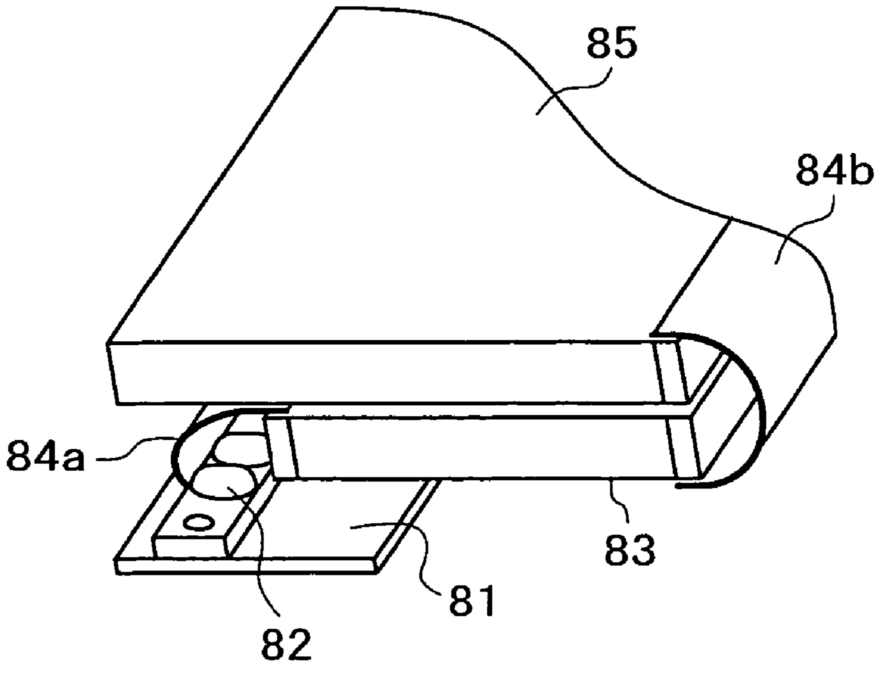

F I G. 2 2
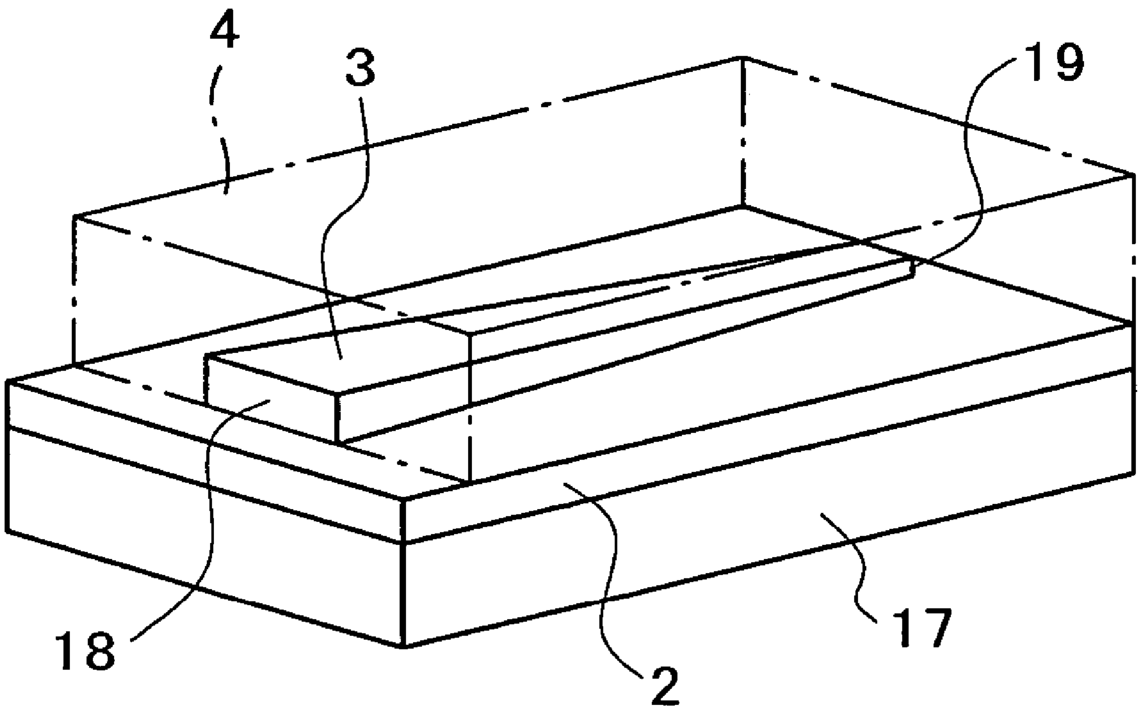

F I G. 2 3 A
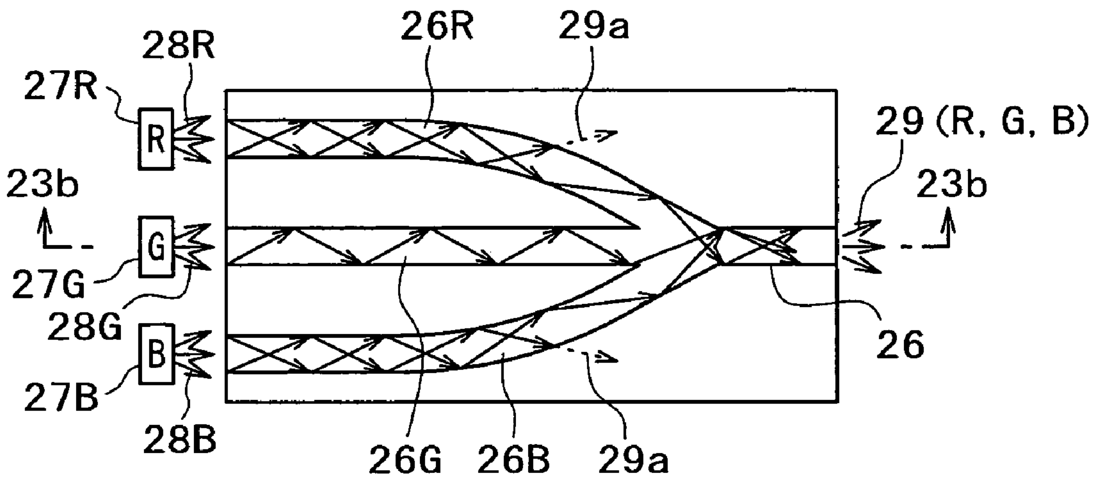
F I G. 2 3 B
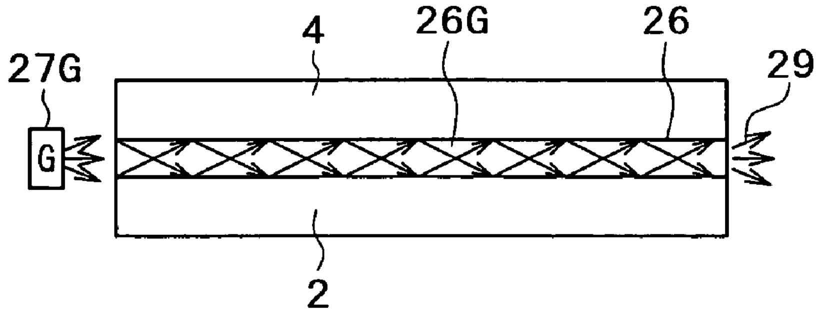
F I G. 2 4
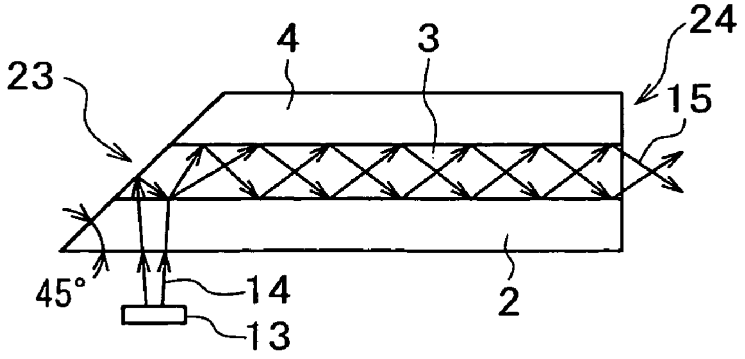

OPTICAL WAVEGUIDE AND OPTICAL INFORMATION PROCESSING DEVICE

BACKGROUND OF THE INVENTION

The present invention relates to an optical waveguide including a joined assembly of a core and cladding layers and suitable for use in a light source module, an optical interconnection, an optical communication component, or the like, and an optical information processing device such as a display device or the like.

Heretofore, it has been customary to transmit information across relatively small distances between boards in electronic devices or chip surfaces on boards thereof primarily with electric signals. For better performance of integrated circuits of electronic devices, it is necessary that electric signals in those integrated circuits be transmitted faster and electric signal interconnections in those integrated circuits be constructed at higher densities. However, signal delays due to time constants of the electric signal interconnections and noise caused by the electric signal interconnections have prevented electric signals from being transmitted faster and also prevented the electric signal interconnections from being constructed at higher densities.

Attention has been directed to optical interconnections as mediums for information transmission. Optical interconnections are applicable to various locations such as between electronic devices, between boards in electronic devices, and between chips in boards, etc. For signal transmission across a short distance such as between chips, there may be constructed an optical transmission/communication system having an optical waveguide formed on a board with the chips mounted thereon, the optical waveguide serving as a transmission path for transmitting a laser beam or the like which is modulated by a signal.

It is also known that an optical waveguide is used as a light source module for display devices. For example, there has been developed a head mounted display (HMD) for the user to enjoy video software images, game images, computer images, and movie images on a large screen occupied by the user alone. As shown in FIG. 20 of the accompanying drawings, there has been proposed a personal display that the user can wear like sunglasses for viewing a virtual image anywhere at will (see U.S. Pat. No. 5,467,104).

The known head mounted display has a light source including red, green, and blue light-emitting diodes (LEDs). Light emitted by an LED is not coherent, but is radiated through a wide radiation angle, and is difficult to converge to combine three colors. There is known a technique for passing LED light in three colors through an optical waveguide for producing uniform white light (Nikkei Electronics Mar. 31, 2003, page 127).

FIGS. 21A and 21B of the accompanying drawings show a module assembly including LEDs and an optical waveguide, which has been developed by Lumileds Lighting, LLC., U.S.A. FIG. 21A is a cross-sectional view of the module assembly and FIG. 21B is a perspective view of the module assembly.

As shown in FIGS. 21A and 21B, a backlight module 80 includes three RGB LED modules 82 mounted on a printed-circuit board 81, an optical waveguide 83, two reflecting mirrors 84*a*, 84*b*, and a light guide plate 85. The LED modules 82 are mounted at spaced intervals of 9 mm in a linear array. RGB LED light 86 emitted from the LED modules 82 is mixed into substantially uniform white light by being reflected by the reflecting mirrors 84*a*, 84*b* and within the optical waveguide 83, and the white light is transmitted through the light guide plate 85 and applied to the back of a liquid crystal panel.

There is also known an optical waveguide having a core whose cross-sectional size is progressively linearly smaller from a light entrance end thereof toward a light exit end thereof, as shown in FIG. 22 of the accompanying drawings (Japanese patent Laid-open No. Hei 5-173036 (page 2, the scope of claims, and page 3, column 3, lines 3-4, and FIG. 1(d))).

The optical waveguide shown in FIG. 22 has a lower cladding layer 2, a core layer 3, and an upper cladding layer 4 indicated by the imaginary lines, which are successively mounted on a board 17. As shown in FIG. 22, the core layer 3 has a cross-sectional area which is progressively linearly smaller, in terms of width and height, from a light entrance end 18 thereof toward a light exit end 19 thereof. Light applied to the light entrance end 18 is guided substantially linearly through the core layer 3 and exits from the light exit end 19.

FIGS. 23A and 23B of the accompanying drawings also show a known trifurcated optical waveguide for emitting a beam of light. FIG. 23A is a plan view of the trifurcated optical waveguide and FIG. 23B is a cross-sectional view taken along line 23*b*-23*b* of FIG. 23A.

The trifurcated optical waveguide has a core layer forked into a red light core 26R, a green light core 26G, and a blue light core 26B which have respective light entrance ends faced respectively by a red light source 27R, a green light source 27G, and a blue light source 27B. The red light core 26R and the blue light core 26B are curved end portions joining the green light core 26G which extends straight, providing a common core 26. RGB signal light 28R, 28G, 28B guided through the red light core 26R, the green light core 26G, and the blue light core 26B is combined by the common core 26 and emitted as a beam of emitted light 29 from the exit end of the common core 26.

Another known optical waveguide is combined with a light source disposed below a core layer. FIG. 24 of the accompanying drawings shows such a known optical waveguide.

As shown in FIG. 24, a core layer 3 having a thickness of about 30 μm, for example, is sandwiched between a lower cladding layer 2 and an upper cladding layer 4, each having a thickness of 14 μm, for example. The core layer 3 has a constant width throughout its length from the light entrance end to the light exit end thereof. The optical waveguide has a light entrance end 23 slanted at 45° with respect to the horizontal plane of the optical waveguide. An LED 13 as a light source is disposed below the slanted light entrance end 23.

The backlight module 80 shown in FIGS. 21A and 21B has the mirrors 84*a*, 84*b* for coupling the light signal 86 from the LED modules 82 to the optical waveguide 83 and the light guide plate 85. Since the optical waveguide and the mirrors are different components, they need to be positionally adjusted when installed in position, and hence the productivity of the backlight module 80 is low. Furthermore, inasmuch as the LED modules 82 and the optical waveguide 83 are vertically separate from each other, the backlight module 80 is not suitable for low-profile integrated configurations. The backlight module 80 fails to convert the converged LED light into a light spot of desired diameter.

The optical waveguide shown in FIG. 22 is of a straight shape free of curved portions. However, the light source combined with the optical waveguide cannot freely be positioned, but needs to be located along the entrance end of the optical waveguide. Such a light source layout tends to cause a light entrance loss.

The optical waveguide shown in FIGS. 23A and 23B is capable of emitting light which has entered through the light entrance end from the light exit end that is positioned opposite to the light entrance end. However, since the LEDs cannot freely be positioned with respect to the optical waveguide, but are limited to the layout of a linear array installation at the light entrance end, they are liable to cause a light entrance loss. In addition, when the R signal light 28R and B signal light 28B are guided respectively by the red light core 26R and the blue light core 26B, leakage light 29*a* occurs from the curved portions of the red light core 26R and the blue light core 26B, as indicated by the broken lines in FIG. 23A. Therefore, the optical waveguide suffers low light collecting efficiency, and is not suitable for a high output design.

The optical waveguide shown in FIG. 24 can receive more light from the light source than the optical waveguides shown in FIGS. 22 and 23A, 23B because the light source (LED) 13 is disposed below the core layer 3 at the light entrance end. However, the signal light 14 from the LED light source 13 is applied to an area having a small width of the core layer 3. As the signal light 14 is radiated from the LED light source 13 through a wide radiation angle, the proportion of the signal light 14 which is reflected by the slanted light entrance end 23 on the core 3 is relatively small. The signal light which is applied to the slanted light entrance end 23 on the lower and upper cladding layers 2, 4 is wasted as a loss. Therefore, the light collecting efficiency of the optical waveguide shown in FIG. 24 is poor.

SUMMARY OF THE INVENTION

It is an object of the present invention to provide a low-cost optical waveguide which has high light entrance efficiency with which light from a light source enters the optical waveguide and high light collecting efficiency with which entered light is collected by the optical waveguide, and an optical information processing apparatus which incorporates such an optical waveguide.

According to the present invention, there is provided an optical waveguide including a joined assembly of a core layer and a cladding layer, the core layer having a light entrance region and a light exit region, the light entrance region having a width greater than the light exit region, the light entrance region having at least a side surface shaped as a reflecting surface for reflecting light applied to the light entrance region toward the light exit region, and a light source disposed in contact with or in facing relation to another surface of the light entrance region than the side surface.

According to the present invention, there is also provided an optical information processing apparatus including an optical waveguide according to the present invention, as described above, light applying means for introducing light into the core layer of the optical waveguide, and light receiving means for receiving light emitted from the core layer.

With the optical waveguide according to the present invention, the light entrance region has a width greater than the light exit region, and the light entrance region has at least a side surface shaped as a reflecting surface for reflecting light applied to the light entrance region toward the light exit region. Since the side surface of the light entrance region has a large area and at least the side surface is shaped as a reflecting surface, an increased amount of light is introduced into the light entrance region of the core layer, and an increased amount of light is reflected from at least the side surface. Therefore, the efficiency with which light is guided toward the light exit region is increased for collecting the introduced light efficiently.

Inasmuch the light source is disposed in contact with or in facing relation to another surface of the light entrance region than the side surface, the light source can easily be positioned in place. Even if the light source is somewhat misaligned in position, since light from the light source is introduced with increased efficiency into the light entrance region, tolerances as to the layout of the light source are large. As the width of the light entrance region is large, the amount of introduced light is increased, and the introduced light is highly efficiently guided and collected toward the light exit region by the reflecting surface for emission from the optical waveguide.

The optical information processing apparatus according to the present invention is made up of the optical waveguide according to the present invention, which offers the above various advantages, the light applying means for introducing light into the core layer of the optical waveguide, and the light receiving means for receiving light emitted from the core layer. The optical information processing apparatus can appropriately be used as an optical communication system, a display, or the like.

In the optical waveguide and the optical information processing apparatus as described above, the side surface of the light entrance region should preferably be of a parabolic shape, a semicircular shape, or a polygonal shape as viewed in plan for increased light collecting efficiency. Furthermore, the at least the side surface of the light entrance region should preferably be covered with a light reflecting metal film for increased light reflecting efficiency.

Preferably, the core layer has at least two cores each having the light entrance region, the cores being joined together at the light exit region to provide a common light exit end, so that light signals having different wavelength ranges can be collected and combined together by the cores.

Moreover, the light source should preferably be integrally disposed in the cladding layer beneath the core layer, and the light source should preferably have a light-emitting portion held against the light entrance region, for allowing the light source to be positioned more accurately and easily, increasing tolerances as to the positioning of the light source, making the optical waveguide lower in profile, and increasing the efficiency with which light is introduced into the light entrance region.

Preferably, the core layer is progressively linearly reduced in width from the light entrance region toward the light exit region for allowing the introduced light to be reflected by at least the side surface of the core layer, guiding the reflected light easily toward the light exit region, and easily shaping the light to be emitted into a light spot having a desired spot diameter.

In the above optical waveguide of the optical information processing apparatus, the light source may include a light-emitting diode. The optical information processing apparatus may be used as a display for projecting the light emitted from the core layer through scanning means.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 2A is a view showing the manner in which light is guided in the optical waveguide shown in FIGS. 1A and 1B, the view being taken along line 2*a*-2*a* of FIG. 2B;

FIG. 2B is a cross-sectional view taken along line 2*b*-2*b* of FIG. 2A;

FIG. 4A is a view showing the manner in which light is guided in the optical waveguide shown in FIGS. 3A and 3B, the view being taken along line 4*a*-4*a* of FIG. 4B;

FIG. 4B is a cross-sectional view taken along line 4*b*-4*b* of FIG. 4A;

FIGS. 7A through 7C and 8A through 8C are views illustrative of a process of fabricating an optical waveguide according to the present invention;

FIGS. 21A and 21B are views of a conventional optical waveguide;

FIG. 22 is a perspective view of another conventional optical waveguide;

FIG. 23A is a cross-sectional view of still another conventional optical waveguide;

FIG. 23B is a cross-sectional view taken along line 23*b*-23*b* of FIG. 23A; and FIG. 24 is a cross-sectional view yet another conventional optical waveguide.

DESCRIPTION OF THE PREFERRED EMBODIMENTS

Embodiment 1

Figure 1A:
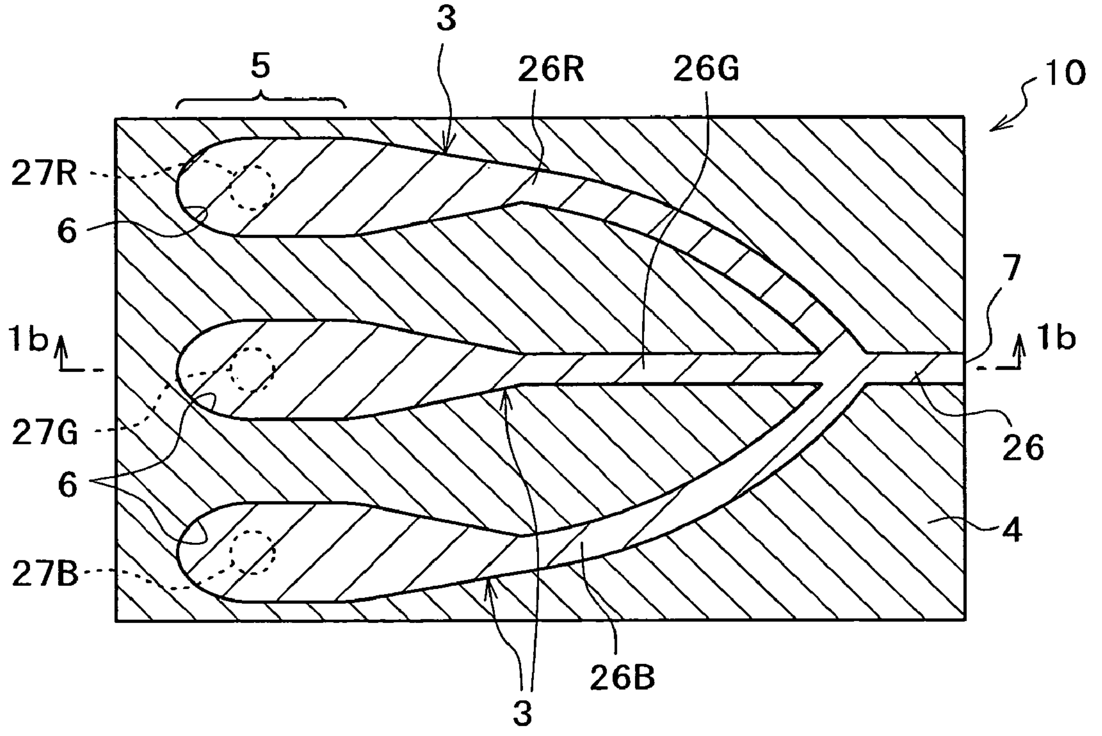
FIG. 1A is a cross-sectional view of an optical waveguide according to a first embodiment of the present invention, the view being taken along line 1*a*-1*a* of FIG. 1B.
Figure 1B:
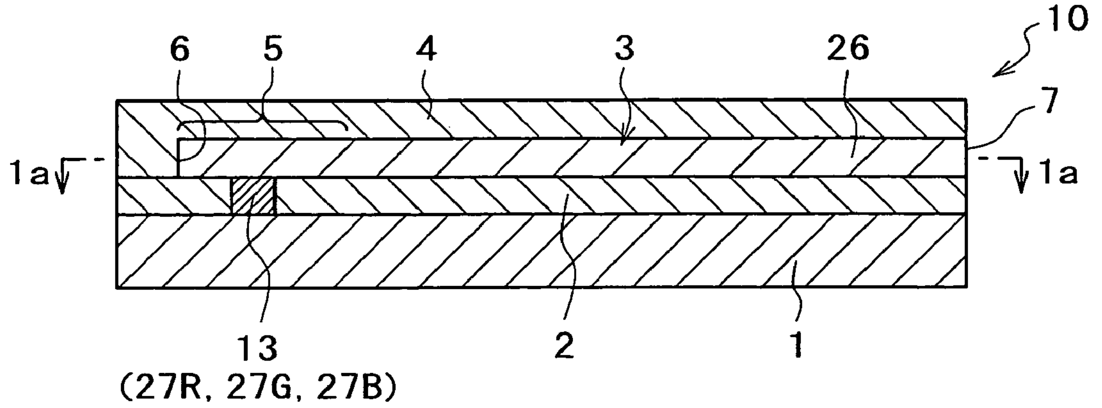
FIG. 1B is a cross-sectional view taken along line 1*b*-1*b* of FIG. 1A.

FIGS. 1A and 1B are cross-sectional views of an optical waveguide 10 according to a first embodiment of the present invention. FIGS. 2A and 2B are cross-sectional views similar to FIGS. 1A and 1B, but showing the manner in which light applied to the optical waveguide 10 is reflected and guided through the optical waveguide 10.

As shown in FIGS. 1A and 1B, the optical waveguide 10 comprises a lower cladding layer 2 mounted on a board 1, an upper cladding layer 4 on the lower cladding layer 2, and a trifurcated core layer 3 disposed between the lower cladding layer 2 and the upper cladding layer 4. LEDs 13 as light sources have light-emitting surfaces held in contact with lower surfaces of light entrance regions 5 of the core layer 3, and are integrally disposed in the lower cladding layer 2. The core layer 3 includes red, green, and blue light cores 26R, 26G, 26B having the respective light entrance regions 5 and joined to a common core 26 having an end face exposed at a light exit region 7 thereof. The light entrance regions 5 are not exposed and have a width greater than the width of the core layer 3 at the light exit region 7. The red, green, and blue light cores 26R, 26G, 26B of the core layer 3 have respective parabolic ends in the light entrance regions 5. Since the LEDs 13 are held against the light entrance regions 5, the LEDs 13 can reliably and easily be positioned for increased light entrance efficiency. The ratio of the width of the LEDs 3 as the light sources and the larger width of the light entrance regions 5 of the core layer 3 should preferably in the range from 1:2 to 1:3.

As shown in FIG. 1A, the LEDs 13 include a red light source 17R, a green light source 27G, and a blue light source 27B. As shown in FIG. 2A, signal light rays emitted from these LEDs 13 are reflected by side surfaces 6 of the light entrance regions 5, and reflected light rays 15 are guided toward the light exit region 7 while being totally reflected within the cores 26R, 26G, 26B, as indicated by the arrows.

The guided light rays 15 are efficiently combined by the common core 26 into a light beam which is emitted from the light exit region 7.

As shown in FIGS. 1A and 2A, since the light entrance regions 5 have the increased width, the side surfaces 6 thereof have an increased area. These side surfaces 6 are formed as reflecting surfaces having a parabolic shape for efficiently reflecting light. Therefore, an increased amount of light is introduced into the light entrance regions 5, and an increased amount of light is reflected from the side surfaces 6 toward the light exit region 7.

Consequently, signal light is emitted from the LEDs 13 into the core layer 3 with high light entrance efficiency, and the entered light is efficiently reflected and guided toward the light exit region 7. The light that is introduced into the core layer 3 which has a high refractive index is confined within the core layer 3, and hardly leaks into the lower cladding layer 2 and the upper cladding layer 4 which have a lower refractive index. In the present embodiment, the core layer 3 has a refractive index n of 1.53, the lower and upper cladding layers 2, 4 have a refractive index n of 1.51, and the board 1 has a refractive index n of 3.5. These values of the refractive indexes apply to other embodiments and modifications according to the present invention.

According to the present embodiment, the light entrance regions 5 of the core layer 3 have a width greater than the light exit region 7, and the side surfaces 6 of the light entrance regions 5 are formed as parabolic reflecting surfaces for efficiently reflecting light emitted from the LEDs 13 into the light entrance regions 5 toward the light exit region 7. Consequently, as the side surfaces 6 of the light entrance regions 5 have an increased area and serve as reflecting surfaces, they receive an increased amount light emitted from the LEDs 13 into the light entrance regions 5 and reflect an increased amount of light.

The efficiency with which the entered light is guided toward the light exit region 7 is increased for emitting the entered light highly efficiently. Because the LEDs 13 are held in contact with the lower surfaces of the light entrance regions 5, the optical waveguide 10 may be of a low profile, and the LEDs 13 can be positioned easily in place. Even if the LEDs 13 are somewhat misaligned in position, the light emitted from the LEDs 13 is introduced highly efficiently into the light entrance regions 5. Inasmuch as the light entrance regions 5 have an increased width, the amount of light introduced into the light entrance regions 5 is increased, and the introduced light is reflected by the interfaces with the cladding layers, including the side surfaces 6, and efficiently guided and converged toward the light exit region 7, from which the light is emitted out of the core layer 3. The emitted light may be shaped into a desired spot diameter depending on the shape of the core layer 3.

Embodiment 2

Figure 3A:
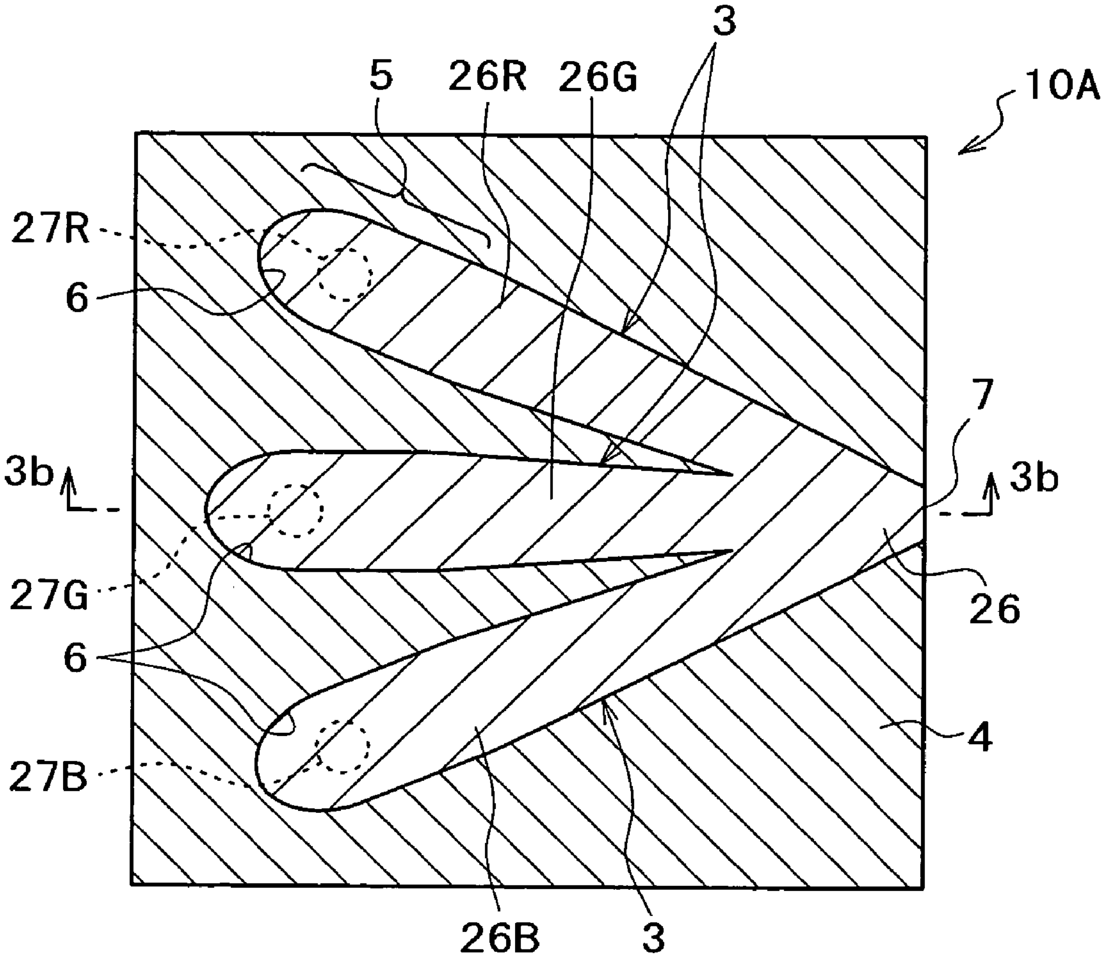
FIG. 3A is a cross-sectional view of an optical waveguide according to a second embodiment of the present invention, the view being taken along line 3*a*-3*a* of FIG. 3B.
Figure 3B:
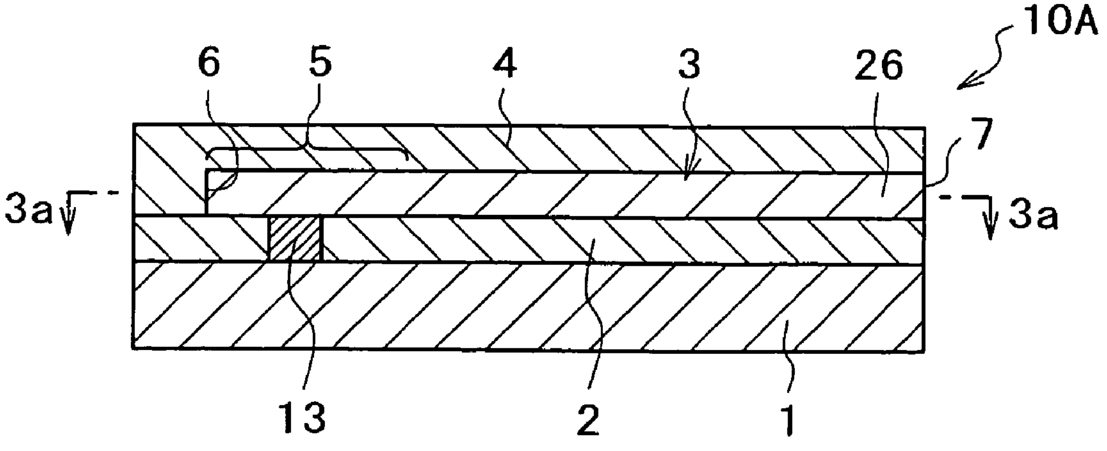
FIG. 3B is a cross-sectional view taken along line 3*b*-3*b* of FIG. 3A.

FIGS. 3A and 3B are cross-sectional views of an optical waveguide 10A according to a second embodiment of the present invention. FIGS. 4A and 4A are cross-sectional views similar to FIGS. 3A and 3B, but showing the manner in which light applied to the optical waveguide 10A is reflected and guided through the optical waveguide 10A.

As shown in FIGS. 3A and 3B, the optical waveguide 10A comprises a lower cladding layer 2 mounted on a board 1, an upper cladding layer 4, and a trifurcated core layer 3 disposed between the lower cladding layer 2 and the upper cladding layer 4 and extending linearly toward a common light exit region 7. LEDs 13 as light sources have light-emitting surfaces held in contact with lower surfaces of light entrance regions 5 of the core layer 3, and are integrally disposed in the lower cladding layer 2. The core layer 3 includes red, green, and blue light cores 26R, 26G, 26B having the respective light entrance regions 5 and joined to a common core 26 having an end face exposed at the light exit region 7 thereof. The light entrance regions 5 are not exposed and have a width greater than the width of the core layer 3 at the light exit region 7. The red, green, and blue light cores 26R, 26G, 26B of the core layer 3 have respective parabolic ends in the light entrance regions 5, and are progressively linearly reduced in width toward the light exit region 7. Since the LEDs 13 are held against the light entrance regions 5, the LEDs 13 can reliably and easily be positioned for increased light entrance efficiency. The ratio of the width of the LEDs 3 as the light sources and the larger width of the light entrance regions 5 of the core layer 3 should preferably in the range from 1:2 to 1:3.

As shown in FIG. 3A, the LEDs 13 include a red light source 17R, a green light source 27G, and a blue light source 27B, as with the first embodiment. As shown in FIG. 4A, signal light rays emitted from these LEDs 13 are reflected by side surfaces 6 of the light entrance regions 5, and reflected light rays 15 are guided toward the light exit region 7 by the cores 26R, 26G, 26B, which are progressively linearly reduced in width toward the light exit region 7, while being totally reflected within the cores 26R, 26G, 26B, as indicated by the arrows. The guided light rays 15 are more efficiently combined by the common core 26 into a light beam which is emitted from the light exit region 7.

As shown in FIGS. 3A and 4A, as with the first embodiment, since the light entrance regions 5 have the increased width, the side surfaces 6 thereof have an increased area. These side surfaces 6 are formed as reflecting surfaces having a parabolic shape for efficiently reflecting light. Therefore, an increased amount of light is introduced into the light entrance regions 5, and an increased amount of light is reflected from the side surfaces 6 toward the light exit region 7. Consequently, signal light is emitted from the LEDs 13 into the core layer 3 with high light entrance efficiency, and the entered light is efficiently reflected and guided toward the light exit region 7.

According to the present embodiment, the light entrance regions 5 of the core layer 3 have a width greater than the light exit region 7, and the side surfaces 6 of the light entrance regions 5 are formed as parabolic reflecting surfaces for efficiently reflecting light emitted from the LEDs 13 into the light entrance regions 5 toward the light exit region 7. Consequently, as the side surfaces 6 of the light entrance regions 5 have an increased area and serve as reflecting surfaces, the efficiency with which the entered light is guided toward the light exit region 7 is increased for emitting the entered light highly efficiently.

Because the LEDs 13 are held in contact with the lower surfaces of the light entrance regions 5, the LEDs 13 can be positioned easily in place. Even if the LEDs 13 are somewhat misaligned in position, the light emitted from the LEDs 13 is introduced highly efficiently into the light entrance regions 5. Inasmuch as the light entrance regions 5 have an increased width, the amount of light introduced into the light entrance regions 5 is increased, and the introduced light is reflected by the side surfaces 6, and efficiently guided and converged toward the light exit region 7, from which the light is emitted out of the core layer 3. Since the cores 26R, 26G, 26B are linearly arranged with respect to the common light exit region 7, i.e., the widths of these cores are progressively linearly reduced toward the light exit region 7, as can be seen from FIG. 6 to be described later on, leakage light from the core to the cladding layers is reduced for increased light guiding efficiency and reduced waveguide length. The optical waveguide 10A according to the second embodiment also offers the same advantages as those of the optical waveguide 10 according to the first embodiment.

Figure 5:
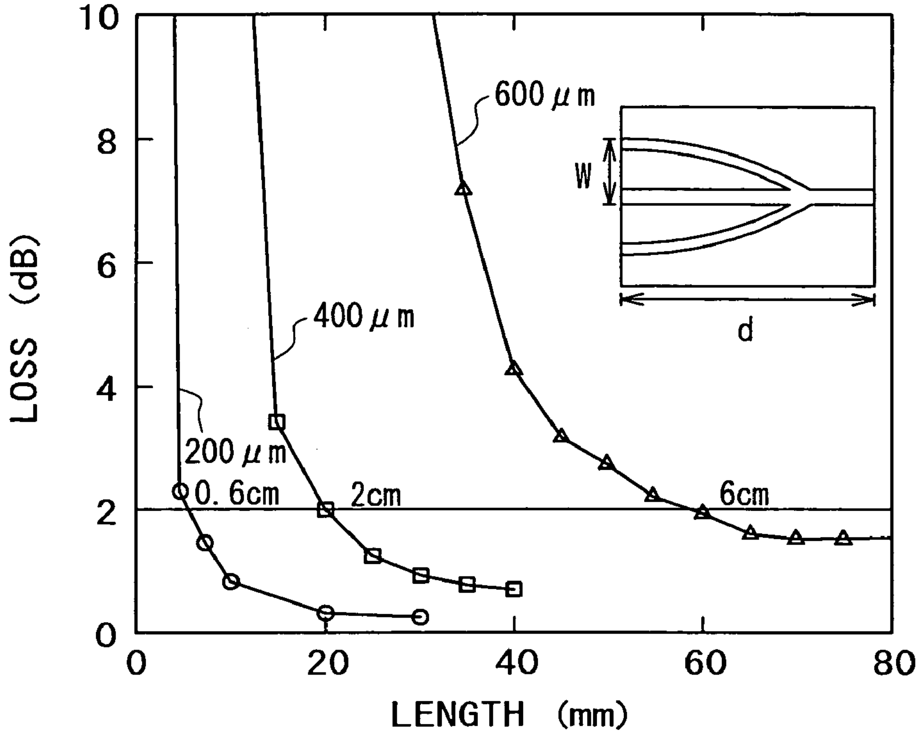
FIG. 5 is a graph showing the relationship between light source pitches and waveguide lengths of trifurcated optical waveguides.
Figure 6:
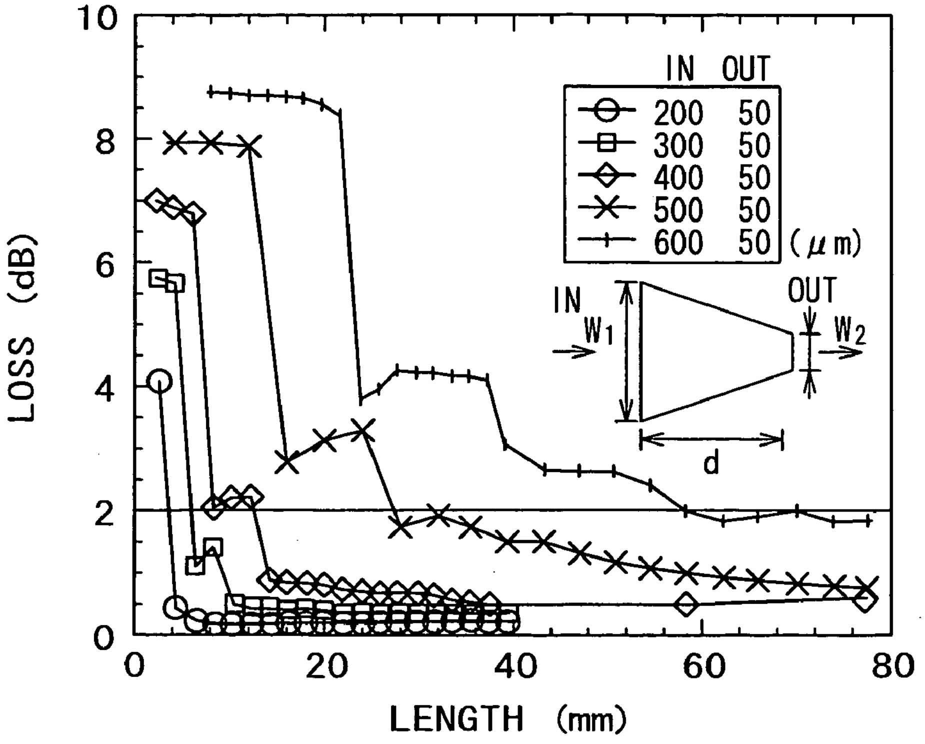
FIG. 6 is a graph showing the relationship between light entrance end widths and waveguide lengths of forward tapered optical waveguides.

FIGS. 5 and 6 are graphs showing data of various optical waveguides.

FIG. 5 shows data of a trifurcated optical waveguide associated with three light sources disposed in confronting relation to the optical waveguide, such as the conventional trifurcated optical waveguide shown in FIG. 22. With the trifurcated optical waveguide of this type, since the light sources need to be positioned at the light entrance end of the core layer 3, the efficiency with which light emitted from the light sources into the small light entrance end is low. The ratio of the amount of introduced light to the amount of light emitted from the light exit end is limited by the pitch W of the light sources.

Specifically, the outer cores of the trifurcated optical waveguide tend to cause a loss of light leaking from the curved portions thereof. As the pitch W of the light sources is greater, the outer cores are more curved, causing a greater loss of light which lowers the efficiency with which light is emitted from the optical waveguide. As the pitch W of the light sources is smaller, the outer cores are less curved, causing a smaller loss of light which increases the efficiency with which light is emitted from the optical waveguide. Therefore, as the pitch W of the light sources is greater, it is necessary to increase the length d of the optical waveguide for controlling the reduction in the efficiency with which light is emitted from the optical waveguide.

Any loss of light which has once been introduced into the optical waveguide should preferably be kept at a level of at most 2 dB. FIG. 5 shows the relationship between the light source pitch W and the waveguide length d for keeping the loss of light which has once been introduced into the optical waveguide at a level of at most 2 dB.

As shown in FIG. 5, if the light source pitch W is set to 400 μm, then the waveguide length d must be 2 cm or more in order to keep the light loss at a level of at most 2 dB.

FIG. 6 shows data of an optical waveguide having a common light entrance region for three light sources with a core being progressively linearly reduced in width toward a light exit region.

As can be seen from FIG. 6, for keeping the loss of light which has once been introduced into the optical waveguide at a level of at most 2 dB, if the width $W_2$ of an end Out is of a constant value, e.g., $W_2$=400 μm, and the width $W_1$ of an end In is changed, then the optical waveguide length d may be about 3 mm. Therefore, the optical waveguide length d may be much smaller than the optical waveguide length d shown in FIG. 5, allowing the optical waveguide to be smaller in size. This is because the sides of the optical waveguide are linearly tapered to eliminate light leakage at the interfaces with the cladding layers. Consequently, the optical waveguides according to the first and second embodiments which employ at least a portion of the core layer having the core width configuration shown in FIG. 6 are effective to reduce a loss of light even if the optical waveguide length is reduced.

The optical waveguides according to the first and second embodiments can be manufactured according to a fabrication process shown in FIGS. 7A through 7C and 8A through 8C. FIGS. 7A through 7C and 8A through 8C schematically show only a portion of the optical waveguide including one of the light entrance regions 5 and a progressively narrower core portion extending therefrom as shown in FIGS. 1A and 3A.

The optical waveguides according to the first and second embodiments serve to guide signal light that is introduced into the core layer 3. The lower cladding layer 2 and the upper cladding layer 4 serve to confine the signal light within the core layer 3. The core layer 3 is made of a material having a high refractive index n of 1.53, the lower and upper cladding layers 2, 4 are made of a material having a refractive index n of 1.51, which is lower than the refractive index of the core layer 3, and the board 1 is made of silicon having a refractive index n of 3.5.

The core layer 3 and the cladding layers 2, 4 should preferably be made of a photopolymerizable resin. If the core layer 3 is made of a photopolymerizable resin, then it can easily be patterned into a core shape corresponding to a pattern exposed to light (particularly, ultraviolet radiation) applied thereto. Such a photopolymerizable resin is also useful as the material of the cladding layers. The photopolymerizable resin may be a high-polymer organic material such as an oxetane resin as disclosed in Japanese Patent Laid-open No. 2000-356720. Such a high-polymer organic material should be permeable to 90% of visible light in a wavelength range from 390 nm to 850 nm. The core layer 3 and the cladding layers 2, 4 may also be made of an inorganic material rather than a photopolymerizable resin.

The optical waveguide may be made of an oxetane resin comprising an oxetane compound having an oxetane ring shown below, or polysilane comprising an oxysilane compound having an oxysilane ring shown below. These materials may be a composition containing a cationic polymerization initiator for initiating polymerization due to a chain reaction for photopolymerization.

Oxetane Ring:

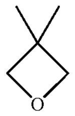

Oxysilane Ring:

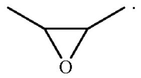

First, as shown in FIG. 7A, an LED 13 as a light source is placed on a silicon board 1. The light source is thus positioned securely in place. In each of FIGS. 7A through 7C and 8A through 8C, the left figure is a cross-sectional view and the right figure is a plan view.

Then, as shown in FIG. 7B, a lower cladding layer 2 is formed on the silicon board 1 by coating such that it will have a thickness of about 30 μm after being polymerized. The lower cladding layer 2 is made of an oxetane resin having a refractive index n of 1.51 which is lower than the core layer.

Then, as shown in FIG. 7C, a core layer material 3A is formed by coating such that it will have a thickness of about 40 μm after being polymerized. The core layer material 3A is an oxetane resin having a refractive index n of 1.53 which is higher than the cladding layers.

Figure 8A:
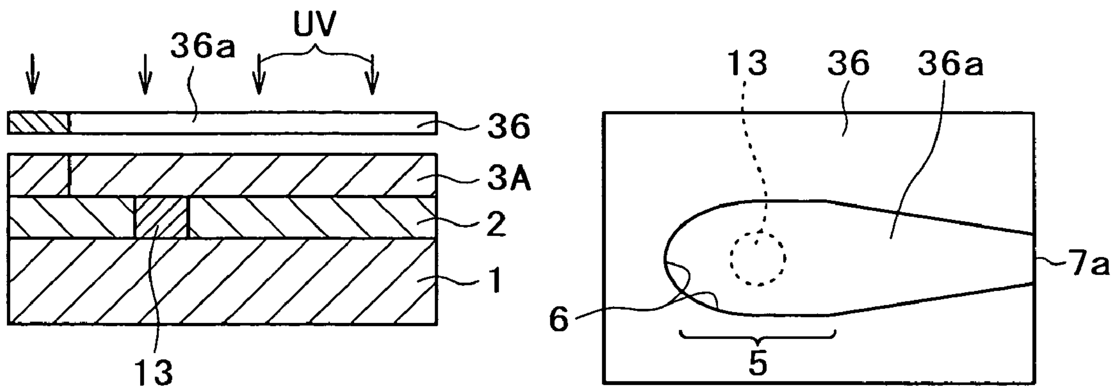

Thereafter, as shown in FIG. 8A, a mask 36 having an opening 36*a* complementary in shape to the core layer as viewed in plan is placed on the core layer material 3A. Then, the entire surface is exposed to an ultraviolet radiation to cure the core layer material 3A below the opening 36*a*. The opening 36*a* of the mask 36 has a region having an increased width corresponding to the light entrance region 5, a parabolic end contiguous to that region, and an opposite end 7*a* corresponding to the light exit region 7 and shaped to provide a predetermined spot size.

Figure 8B:
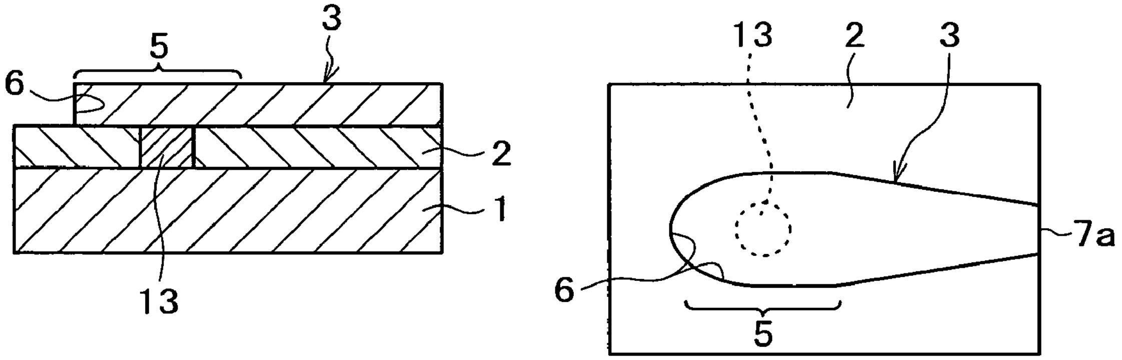

Then, as shown in FIG. 8B, the mask 36 is removed to produce a core layer 3 which is complementary in shape to the opening 36*a* of the mask 36. The core layer 3 thus formed has a light entrance region 5 for introducing signal light from the LED 13 with increased efficiency, and a side surface 6 having a parabolic end contiguous to the light entrance region 5 and serving as reflecting surfaces.

Figure 8C:
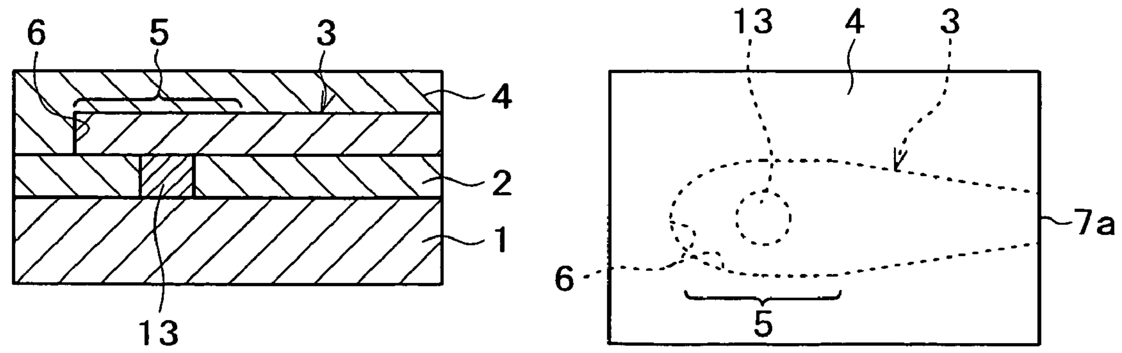

Thereafter, as shown in FIG. 8C, an upper cladding layer 4 is formed on the entire surface including the core layer 3 by coating such that it will have the same thickness as the lower cladding layer 2. The upper cladding layer 4 is made of the same material as the lower cladding 2. In this manner, the optical waveguide 10 according to the first embodiment shown in FIGS. 1A and 1B is fabricated. The opening 36*a* of the mask 36 shown in FIG. 8A may be changed to produce the optical waveguide 10A according to the second embodiment shown in FIGS. 3A and 3B.

As described above, to fabricate the optical waveguides according to the first and second embodiments, high-polymer materials having different refractive indexes are successively deposited on the substrate 1 with the LED 13 installed thereon, thereby forming the lower cladding layer 2, the core layer 3, and the upper cladding layer 4. The core layer 3 is produced using the mask 36 having such a pattern as to surround the LED 13 to form the light entrance region 5 of increased width. Light emitted from the LED 13 is efficiently introduced into the light entrance region 5 and the introduced light is reflected by the side surface 6 of the light entrance region 5. The core layer at the light exit region 7*a* may be adjusted in size to emit the guided light as a spot of light having a desired spot size. The high-performance optical waveguides according to the above embodiments can be manufactured at a low cost.

Modifications according to the present invention, which may be applied to the first and second embodiments described above, will be described below with reference to FIGS. 9A and 9B through 19A, 19B, and 19C. FIGS. 9A and 9B through 19A, 19B, and 19C show only a portion of the optical waveguide which corresponds to the portion shown in FIGS. 7A through 7C and 8A through 8C.

FIGS. 9A and 9B through 11A and 11B show optical waveguides whose light entrance regions have ends having shaped other than the parabolic shape according to the first and second embodiments.

Figure 9A:
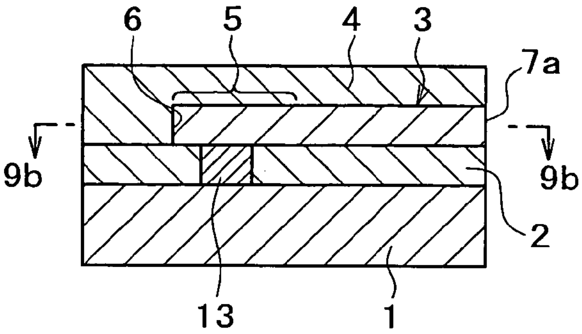
FIG. 9A is a cross-sectional view of a modified optical waveguide according to the present invention.
Figure 9B:
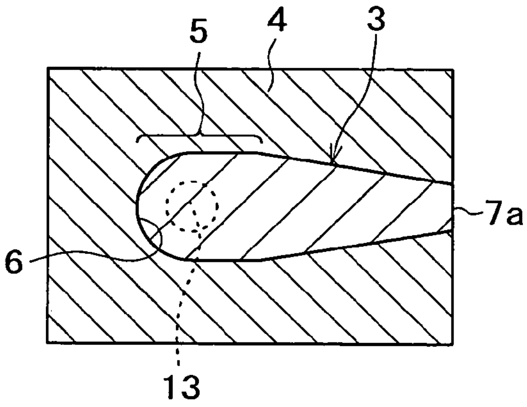
FIG. 9B is a cross-sectional view taken along line 9*b*-9*b* of FIG. 9A.

In FIGS. 9A and 9B, the light entrance region 5 has a semicircular end. The semicircular end of the light entrance region 5 can easily be formed by changing the mask 36 shown in FIG. 8A in the above fabrication process. The light entrance region 5 has an increased width. Other details of the optical waveguide than the shape of the light entrance region 5 are identical to those of the optical waveguides according to the first and second embodiments. Introduced light which is reflected by the side surface 6 at the semicircular end of the light entrance region 5 is efficiently guided toward the light exit region 7*a*, thus providing light collecting efficiency similar to that of the optical waveguides according to the first and second embodiments.

Figure 10A:
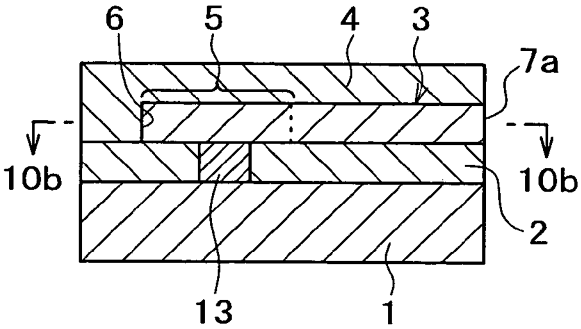
FIG. 10A is a cross-sectional view of another modified optical waveguide according to the present invention.
Figure 10B:
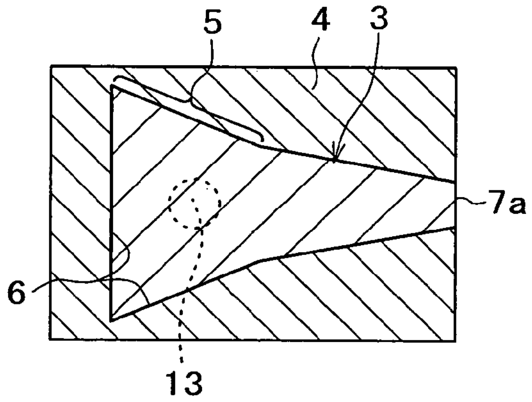
FIG. 10B is a cross-sectional view taken along line 10*b*-10*b* of FIG. 10A.

In FIGS. 10A and 10B, the light entrance region 5 has a triangular end. The triangular end of the light entrance region 5 can easily be formed by changing the mask 36 shown in FIG. 8A in the above fabrication process. Though the light entrance region 5 is shaped differently, introduced light from the light source is effectively reflected by reflecting surfaces on three sides of the triangular end, and is efficiently guided toward the light exit region 7*a*. The light entrance region 5 has an increased width. Other details of the optical waveguide than the shape of the light entrance region 5 are identical to those of the optical waveguides according to the first and second embodiments. The optical waveguide shown in FIGS. 10A and 10B provides light collecting efficiency similar to that of the optical waveguides according to the first and second embodiments.

Figure 11A:
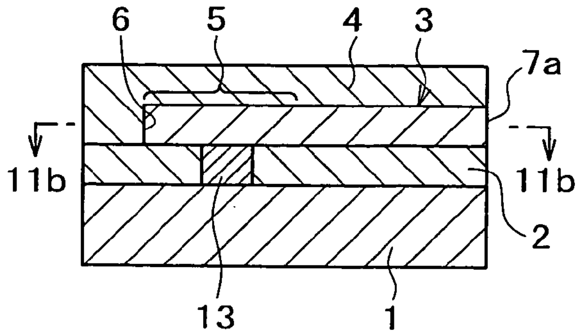
FIG. 11A is a cross-sectional view of still another modified optical waveguide according to the present invention.
Figure 11B:
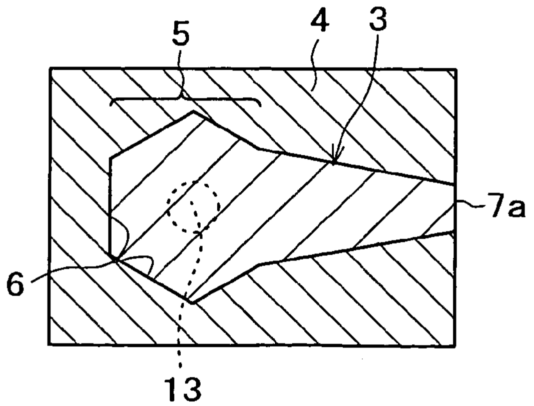
FIG. 11B is a cross-sectional view taken along line 11*b*-11*b* of FIG. 11A.

In FIGS. 11A and 11B, the light entrance region 5 has a hexagonal end. The hexagonal end of the light entrance region 5 can easily be formed by changing the mask 36 shown in FIG. 8A in the above fabrication process. Though the light entrance region 5 is shaped differently, introduced light from the light source is effectively reflected by reflecting surfaces on six sides of the hexagonal end, and is efficiently guided toward the light exit region 7*a*. The light entrance region 5 has an increased width. Other details of the optical waveguide than the shape of the light entrance region 5 are identical to those of the optical waveguides according to the first and second embodiments. The optical waveguide shown in FIGS. 10A and 10B provides light collecting efficiency similar to that of the optical waveguides according to the first and second embodiments.

The light entrance region 5 may have any of various polygonal ends other than the triangular end shown in FIGS. 10A and 10B and the hexagonal end shown in FIGS. 11A and 11B.

The optical waveguides described above may have a reflecting mirror made of light reflecting metal on a side surface, an upper surface, or a lower surface of the light entrance region, as shown in FIGS. 12A through 12C through 18A and 18B.

Figure 12A:
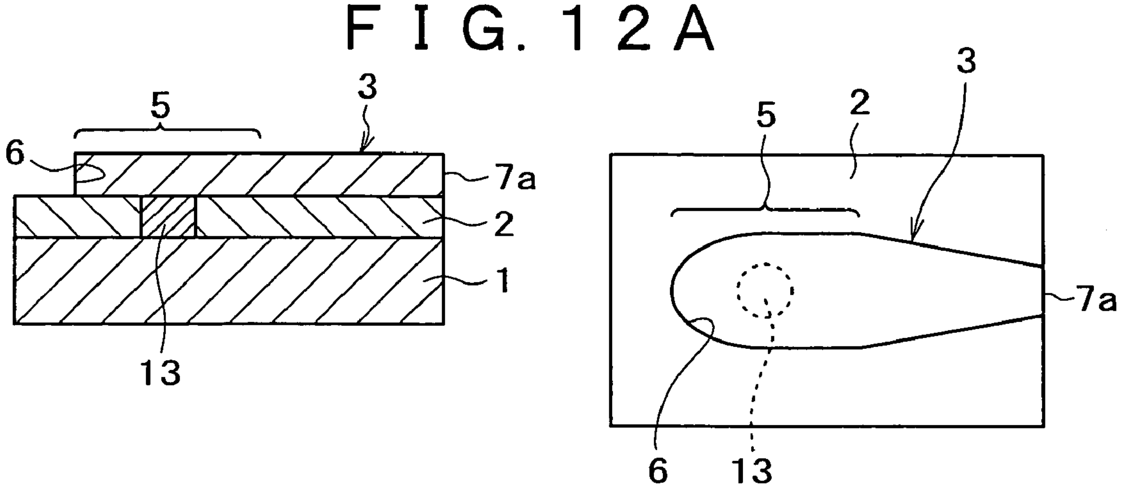
FIGS. 12A through 12C are views illustrative of a process of fabricating a modified optical waveguide according to the present invention.
Figure 12B:
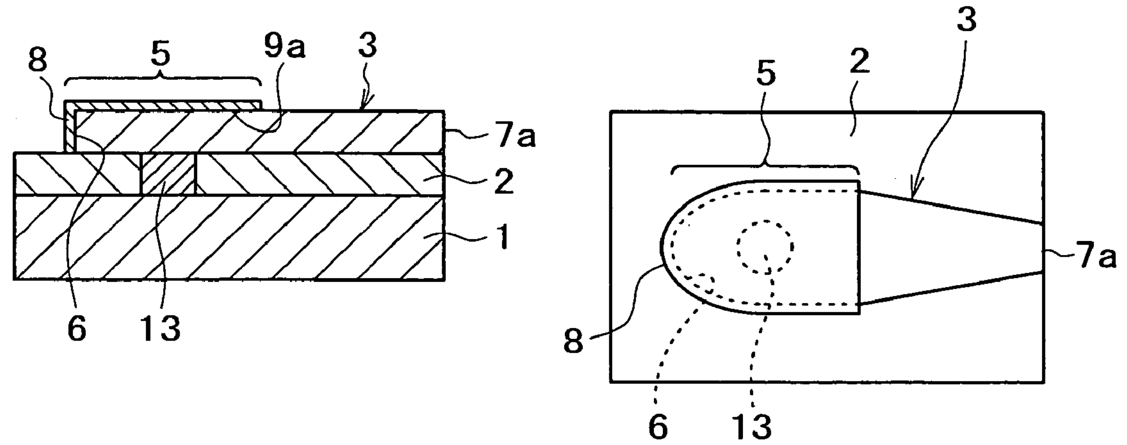
Figure 12C:
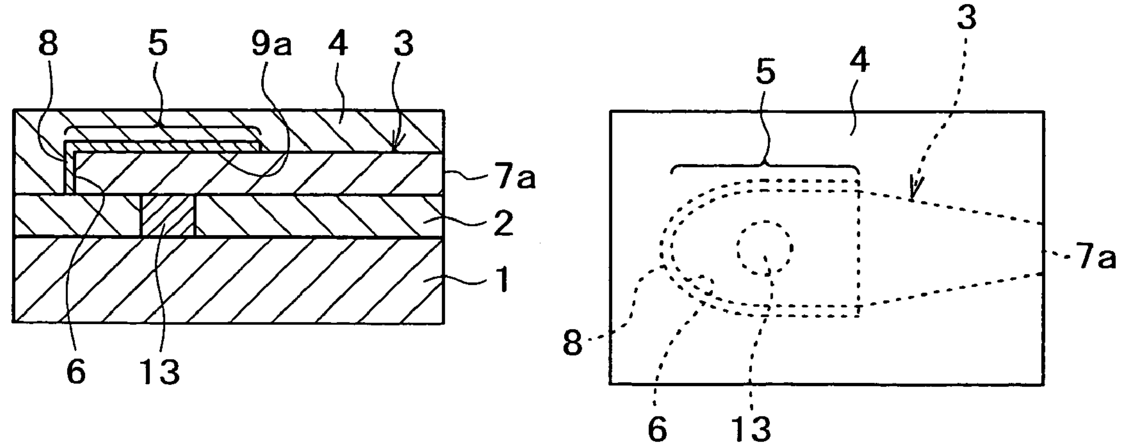

FIGS. 12A through 12C show a process of forming a reflecting mirror 8 on a side surface 6 and an upper surface 9*a* of the light entrance region 5 having a parabolic end. The reflecting mirror 8 may be formed in the fabrication process described above.

FIG. 12A corresponds to FIG. 8A which shows the fabrication process described above. In FIG. 12B, a reflecting mirror (reflecting film) 8 is formed on a side surface 6 and an upper surface 9*a* of the light entrance region 5. The reflecting mirror 8 may be formed by depositing the light reflecting metal according to sputtering, for example.

Then, as shown in FIG. 12C, the upper cladding layer 4 is formed according to a process similar to the process shown in FIG. 8C, thus producing an optical waveguide having better light reflecting efficiency. The reflecting mirror 8 of the above structure is also applicable to the light entrance region having the semicircular end as shown in FIGS. 9A and 9B and the light entrance region having the polygonal end as shown in FIGS. 10A, 10B, 11A and 11B.

The reflecting mirror 8 may be made of a metal such as Au, Al, Ti, or the like patterned to shape. The reflecting mirror 8 is effective to sufficiently increase the efficiency with which to reflect the introduced light toward the light exit region 7*a* and also to reduce light leakage out of the core layer 3. Therefore, the optical waveguide with the reflecting mirror 8 has better light collecting efficiency than the optical waveguides according to the first and second embodiments.

FIGS. 13A and 13B through 15A and 15B show optical waveguides wherein a reflecting mirror 8 is disposed on only the side surface 6 of the light entrance region 5. The optical waveguide with the semicircular light entrance region end is omitted from illustration.

Figure 13A:
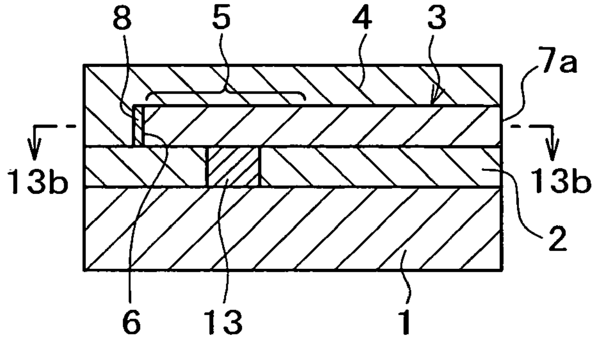
FIG. 13A is a cross-sectional view of another modified optical waveguide according to the present invention.
Figure 13B:
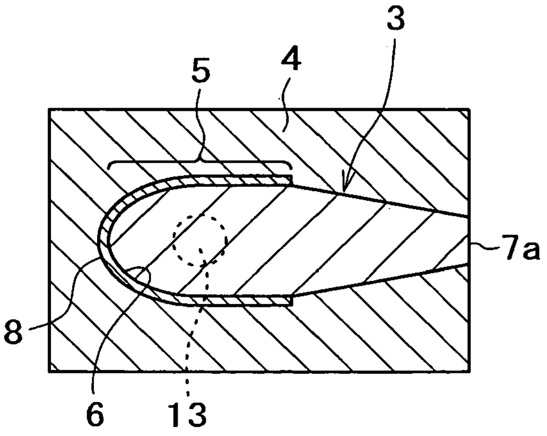
FIG. 13B is a cross-sectional view taken along line 13*b*-13*b* of FIG. 13A.
Figure 14A:
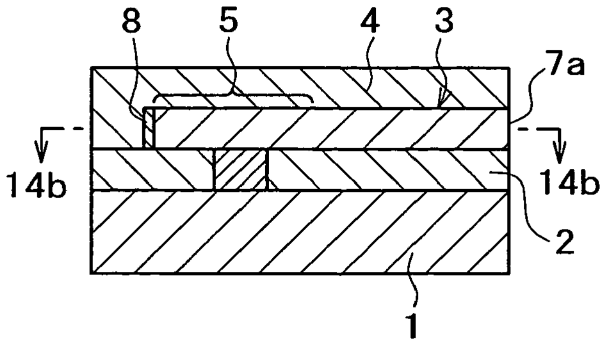
FIG. 14A is a cross-sectional view of still another modified optical waveguide according to the present invention.
Figure 14B:
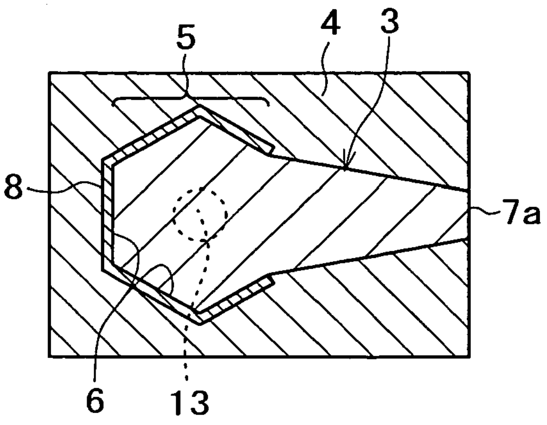
FIG. 14B is a cross-sectional view taken along line 14*b*-14*b* of FIG. 14A.
Figure 15A:
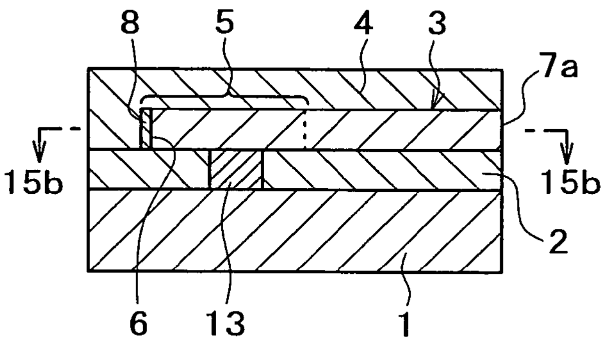
FIG. 15A is a cross-sectional view of yet another modified optical waveguide according to the present invention.
Figure 15B:
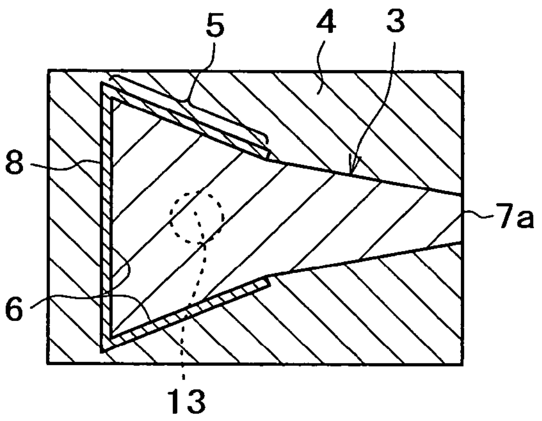
FIG. 15B is a cross-sectional view taken along line 15*b*-15*b* of FIG. 15A.

FIGS. 13A and 13B show the optical waveguide whose light entrance region has a parabolic end. FIGS. 14A and 14B show the optical waveguide whose light entrance region has a hexagonal end. FIGS. 15A and 15B show the optical waveguide whose light entrance region has a triangular end. In each of these modifications, the reflecting mirror 8 is disposed on the side surface 6 for making the light reflecting efficiency better than with the optical waveguides according to the first and second embodiments. These modified optical waveguides are of higher light collecting efficiency than the optical waveguides shown in FIGS. 1A and 1B through 11A and 11B. The modified optical waveguides can easily be fabricated by the above fabrication process.

FIGS. 16A and 16B through 18A and 18B show optical waveguides wherein a reflecting mirror 8 is disposed on the side surface 6 and upper and lower surfaces 9*a*, 9*b* of the light entrance region 5. The optical waveguide with the semicircular light entrance region end is omitted from illustration.

Figure 16A:
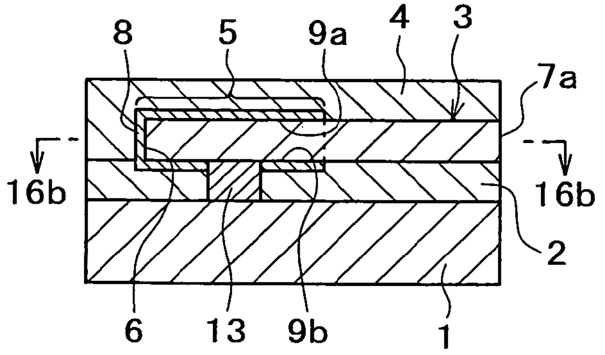
FIG. 16A is a cross-sectional view of yet still another modified optical waveguide according to the present invention.
Figure 16B:
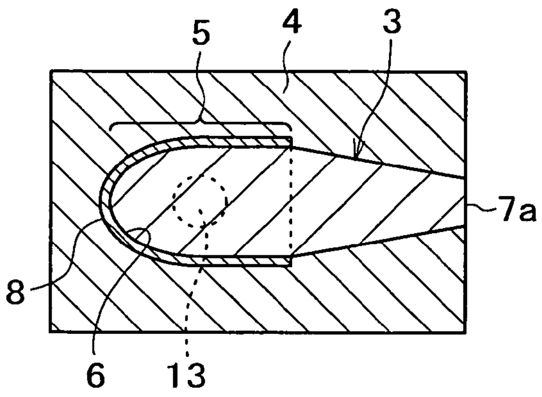
FIG. 16B is a cross-sectional view taken along line 16*b*-16*b* of FIG. 16A.
Figure 17A:
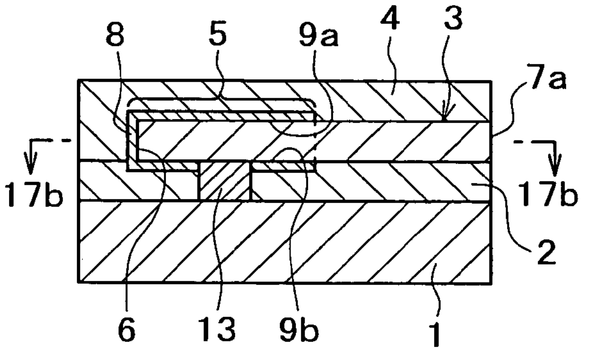
FIG. 17A is a cross-sectional view of a further modified optical waveguide according to the present invention.
Figure 17B:
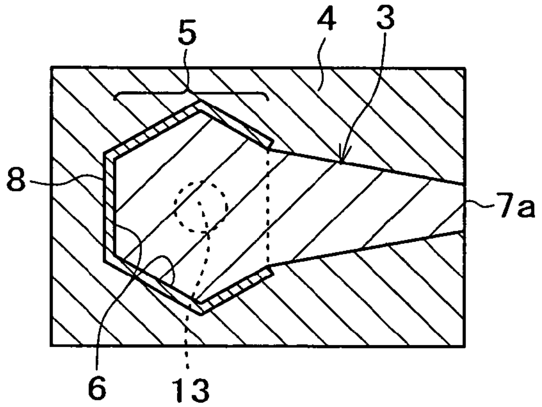
FIG. 17B is a cross-sectional view taken along line 17*b*-17*b* of FIG. 17A.
Figure 18A:
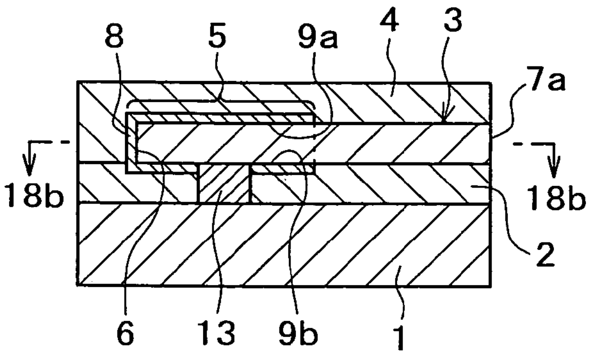
FIG. 18A is a cross-sectional view of a still further modified optical waveguide according to the present invention.
Figure 18B:
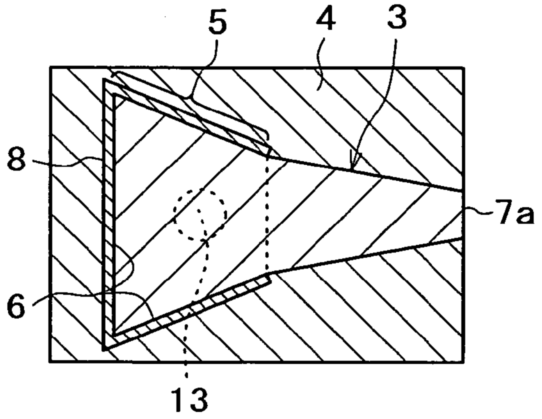
FIG. 18B is a cross-sectional view taken along line 18*b*-18*b* of FIG. 18A.

FIGS. 16A and 16B show the optical waveguide whose light entrance region has a parabolic end. FIGS. 17A and 17B show the optical waveguide whose light entrance region has a hexagonal end. FIGS. 18A and 18B show the optical waveguide whose light entrance region has a triangular end. In each of these modifications, the reflecting mirror 8 is disposed on the side surface 6 and upper and lower surfaces 9*a*, 9*b* for making the light reflecting efficiency better than with the optical waveguides shown in FIGS. 13A and 13B, 14A and 14B, and 15A and 15B. These modified optical waveguides are of higher light collecting efficiency than the optical waveguides shown in FIGS. 13A and 13B, 14A and 14B, and 15A and 15B. The reflecting mirrors 8 thus constructed can easily be fabricated by the above fabrication process.

Figure 19A:
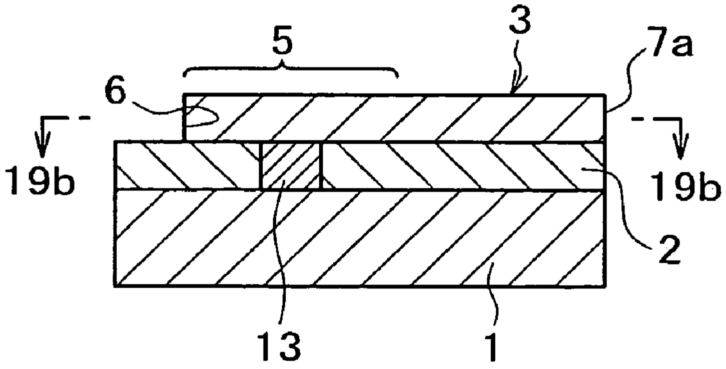
FIG. 19A is a cross-sectional view of a yet still further modified optical waveguide according to the present invention.
Figure 19B:
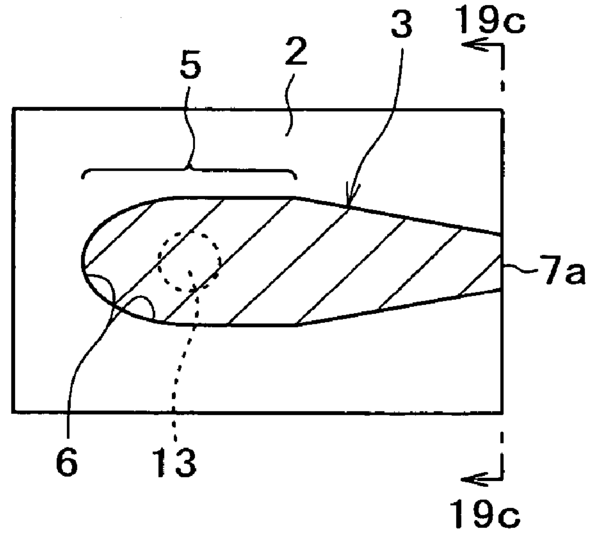
FIG. 19B is a cross-sectional view taken along line 19*b*-19*b* of FIG. 19A.
Figure 19C:
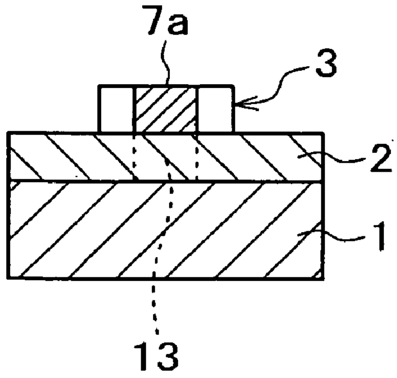
FIG. 19C is a cross-sectional view taken along line 19*c*-19*c* of FIG. 19B.

FIGS. 19A through 19C show a modified optical waveguide which is free of an upper cladding layer.

With the modified optical waveguide shown in FIGS. 19A through 19C, leakage light which would otherwise occur upwardly from the core layer 3 into an upper cladding layer is eliminated, and emitted light from the optical waveguide is mainly obtained from the core layer 3. Therefore, the spot of the emitted light may be of a small size corresponding to the cross-sectional shape of the core layer 3. While the end of the light entrance region 5 shown in FIGS. 19A through 19C is of a parabolic shape, the principles of the modified optical waveguide shown in FIGS. 19A through 19C are also applicable to light entrance regions 5 having other end shapes. Since the modified optical waveguide shown in FIGS. 19A through 19C can be fabricated by a simpler process, its cost is reduced.

As described above, the optical waveguides according to the above embodiments and modifications are capable of efficiently collecting light emitted from the LEDs 13 and coupling the light with the optical waveguides. Since the LEDs 13 are integrally combined with the light entrance region 5 of the core layer 3, tolerances such as positional misalignments are large, and the overall optical waveguides can be of a low profile. Furthermore, the core end which is of a parabolic shape or the like is effective to collect LED light efficiently. The optical waveguides may be adjusted in shape to guide the collected LED light and emit the guided light as a light spot having a desired diameter.

The optical waveguide according to the first or second embodiment has the core layer divided into the red light core 26R, the green light core 26G, and the blue light core 26B, and the red light source 27R, the green light source 27G, and the blue light source 27B, each comprising an LED, are disposed in contact with the lower surfaces of the light entrance regions 5 of the cores 26R, 26G, 26B. The red light core 26R and the blue light core 26B are joined to the green light core 26G at a front portion thereof, providing an end of the common core 26. Signal light rays 28R, 28G, 28R guided respectively through the cores 26R, 26G, 26B are thus combined with each other by the common core 26 into a light beam which is emitted from the light exit region 7 at the other end of the common core 26.

By controlling the intensities and color balance of the signal light rays, the beam of emitted light 29 (R, G, B) is projected as signal light having desired color information onto a next stage, such as a screen, thus providing a display capable of reproducing a full-color image.

Figure 20:
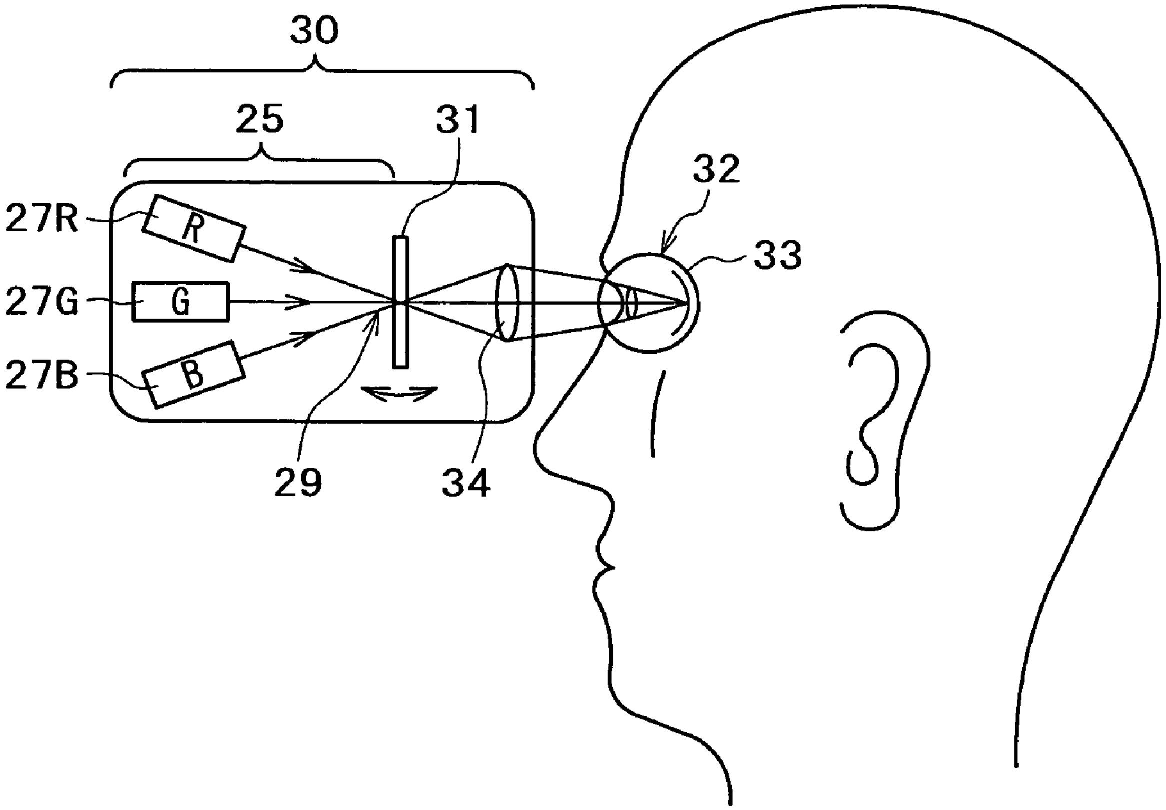
FIG. 20 is a schematic elevational view of a display incorporating an optical waveguide according to the present invention.

If such a display is applied to the head mounted display (HMD) 30 shown in FIG. 20, then the optical waveguide shown in FIGS. 1A and 1B or 3A and 3B is used as a unit pixel. The head mounted display has a linear array of such unit pixel units, arranged perpendicular to the sheet of FIG. 20. Reduced-diameter beams of emitted light 29 from the optical waveguides as pixel units are passed through a scanned image plane 31, and then focused as spots by an optical lens 34 onto a retina 33 of a human eye 32 which is optically conjugate relation to the scanned image plane 31. The focused spots are generated as a single line on the retina 33. Since the focused spots are deflected on the retina 33 in a direction perpendicular to the single line, the user of the head mounted display 30 can experience and enjoy a virtual image personally with the head mounted display 30.

In such a display, the three-color light rays emitted from the LEDs 27R, 27G, 27B are generally not coherent and are radiated through a wide radiation angle and difficult to combine with each other. According to the above embodiments, since the light rays emitted from the LEDs are introduced into the cores of the optical waveguide and collected and emitted as a desired beam spot, the optical waveguide is highly useful as a spot light source in the display.

The head mounted display 30 as it is worn as sunglasses by the user may be combined with a projector, a camera, a computer, or a game machine, thereby providing a compact video display system.

Various changes and modifications may be made in the optical waveguides according to the above embodiments and modifications.

For example, the various components of the optical waveguides may be made of various different materials from those described above, and the layers of the optical waveguides may be arranged in patterns different from those described above. The various components of the optical waveguides may be made of other materials than those described above insofar as they can provide the same advantages as described above.

The shape of the light entrance region 5 and the layout of the light sources may be different from those described above in the above embodiments and modifications. For example, the light sources may be disposed out of contact with the light entrance regions of the core layer, i.e., the light-emitting surfaces of the LEDs may be spaced from the interface between the core layer and the lower cladding layer. Alternatively, the LEDs 13 may be disposed on the upper surface of the light entrance region 5 to introduce emitted light downwardly into the light entrance region 5. The light entrance region 5 may be of a semielliptic shape.

The optical system in the head mounted display 30 may be modified in arrangement. For example, the optical system may employ scanning means comprising a micromirror device and a polygon mirror, and may project an image onto a screen.

The present invention is applicable to a wide range of various operation information processing applications including a display having optical waveguides for guiding LED light or laser beams as light sources, and an optical communication system for applying signal light from optical waveguides which guide laser beams to light receiving elements in a next stage, such as optical interconnections, photodetectors, etc.

The principles of the present invention can be incorporated in a display wherein optical waveguides collect and emit light rays efficiently or signal light efficiently introduced into optical waveguides is emitted and scanned by scanning means and projected, or an optical information processing system such as an optical communication system wherein signal light emitted from optical waveguides is applied to light receiving elements in a next stage, such as optical interconnections, photodetectors, etc.

Although certain preferred embodiments of the present invention have been shown and described in detail, it should be understood that various changes and modifications may be made therein without departing from the scope of the appended claims.

What is claimed is:

1. An optical waveguide comprising:

a joined assembly of a core layer and a cladding layer;

said core layer having a light entrance region and a light exit region, said light entrance region having a width greater than said light exit region;

said light entrance region having at least a side surface shaped as a reflecting surface for reflecting light applied to said light entrance region toward said light exit region; and a light source disposed in contact with or in facing relation to an outer-surface of said light entrance region of said core layer in a direction substantially perpendicular to the direction of light travel from the light entrance region of the core to the light exit region of the core, wherein said core layer has at least two separate core branches each having said light entrance region, said core branches being joined together at said light exit region to provide a common light exit end.

2. The optical waveguide according to claim 1, wherein light signals having different wavelength ranges are collected and combined together in said common light exit end.

3. An optical waveguide comprising:

a joined assembly of a core layer and a cladding layer;

said core layer having a light entrance region and a light exit region;

said light entrance region having at least a side surface shaped as a reflecting surface for reflecting light applied to said light entrance region toward said light exit region; and a light source disposed in contact with or in facing relation to an outer-surface of said light entrance region of said core layer in a direction substantially perpendicular to the direction of light travel from the light entrance region of the core to the light exit region of the core, wherein said core layer has at least two separate core branches each having said light entrance region, said core branches being joined together at said light exit region to provide a common light exit end.

4. The optical waveguide according to claim 3, wherein light signals having different wavelength ranges are collected and combined together in said common light exit end.

* * * * *